US009460665B2

(12) United States Patent
Jiang et al.

(10) Patent No.: US 9,460,665 B2
(45) Date of Patent: Oct. 4, 2016

(54) NANO-MEDIA INFORMATION CARRIER BASED ON PIXELATED NANO-STRUCTURES COMBINED WITH AN INTENSITY CONTROL LAYER

(71) Applicant: NanoMedia Solutions Inc., Vancouver (CA)

(72) Inventors: Hao Jiang, Coquitlam (CA); Reza Qarehbaghi, Burnaby (CA); Bozena Kaminska, Vancouver (CA); Mohamadreza Najiminaini, London (CA); Jeffrey J. L. Carson, London (CA); Mohamad Rezaei, New Westminster (CA)

(73) Assignee: Nanomedia Solutions Inc., Vancouver, BC (CA)

( * ) Notice: Subject to any disclaimer, the term of this patent is extended or adjusted under 35 U.S.C. 154(b) by 106 days.

(21) Appl. No.: 14/455,369

(22) Filed: Aug. 8, 2014

(65) Prior Publication Data
US 2015/0042702 A1     Feb. 12, 2015

Related U.S. Application Data

(60) Provisional application No. 61/864,615, filed on Aug. 11, 2013.

(51) Int. Cl.
*H01L 27/32* (2006.01)
*H01L 27/146* (2006.01)
(Continued)

(52) U.S. Cl.
CPC ............ *G09G 3/3413* (2013.01); *B42D 25/328* (2014.10); *G02B 1/005* (2013.01); *G02B 5/008* (2013.01)

(58) Field of Classification Search
CPC ................... H01L 27/14603; H01L 27/14609
See application file for complete search history.

(56) References Cited

U.S. PATENT DOCUMENTS

| 1,003,720 A | 9/1911 | Dufay et al. |
| 1,997,493 A | 4/1935 | Mannes et al. |

(Continued)

FOREIGN PATENT DOCUMENTS

| JP | 48102632 | * 12/1973 | |
| JP | 48102632 A | * 12/1973 | ............. C01B 19/04 |
| WO | WO2012157486 A1 | 11/2012 | |

OTHER PUBLICATIONS

Zeng et al., "Ultrathin Nanostructured Metals for Highly Transmissive Plasmonic Subtractive Color Filters", Scientific Reports 3, articles No. 2840, dated Oct. 8, 2013, 24 pages.
(Continued)

*Primary Examiner* — Lin Li
(74) *Attorney, Agent, or Firm* — Hickman Palermo Becker Bingham LLP

(57) ABSTRACT

A display media including a pixel layer containing subpixels for different optical bands composed of nano-scale structures and an intensity control layer that can pattern the luminance of the subpixels. The display media includes a substrate layer, a sub-wavelength substrate supported by the substrate layer and including subpixels, each subpixel defined by at least one sub-wavelength structure having at least one specific optical property including a specific optical band, at least two of the subpixels having a different specific optical property, and an intensity control layer to individually control an amount of luminance of each individual subpixel in a pattern. Some of the subpixels may have colors that define a color space, while some other subpixels may have an invisible radiation spectrum band. For example, the display media can allow both overt information (color images) and covert information to be embedded together with high density.

37 Claims, 14 Drawing Sheets

(51) Int. Cl.
*H04N 13/04* (2006.01)
*B82Y 20/00* (2011.01)
*H04N 5/235* (2006.01)
*B42D 25/29* (2014.01)
*H04N 1/00* (2006.01)
*G02F 1/1335* (2006.01)
*H04N 5/232* (2006.01)
*G02F 1/133* (2006.01)
*H01L 31/02* (2006.01)
*G09G 3/34* (2006.01)
*G02B 1/00* (2006.01)
*G02B 5/00* (2006.01)
*B42D 25/328* (2014.01)

(56) References Cited

U.S. PATENT DOCUMENTS

| | | | |
|---|---|---|---|
| 4,322,493 A | 3/1982 | Shibaoka et al. | |
| 4,484,797 A | 11/1984 | Knop et al. | |
| 4,985,348 A | 1/1991 | Hirano et al. | |
| 5,488,504 A * | 1/1996 | Worchesky | B82Y 20/00 359/248 |
| 5,719,850 A * | 2/1998 | Yoshioka | G06K 19/06046 369/283 |
| 6,040,936 A | 3/2000 | Ebbesen et al. | |
| 6,052,238 A | 4/2000 | Ebbesen et al. | |
| 6,278,427 B1 * | 8/2001 | Matsumoto | G02F 1/134363 345/87 |
| 6,285,020 B1 | 9/2001 | Kim et al. | |
| 6,582,988 B1 * | 6/2003 | Hsiao | G02B 3/0018 257/E31.128 |
| 6,812,966 B1 * | 11/2004 | Nakazawa | H04N 1/0044 348/207.2 |
| 6,886,748 B1 * | 5/2005 | Moore | G06Q 10/087 235/375 |
| 8,253,536 B2 | 8/2012 | Kaminska et al. | |
| 8,345,343 B2 * | 1/2013 | Kim | G02F 1/133553 349/198 |
| 2004/0113543 A1 * | 6/2004 | Daniels | H01L 27/14627 313/504 |
| 2005/0067668 A1 * | 3/2005 | Jang | H01L 27/14645 257/432 |
| 2007/0058927 A1 * | 3/2007 | Gough | G11B 27/005 386/344 |
| 2009/0152664 A1 * | 6/2009 | Klem | H01L 27/14603 257/440 |
| 2010/0039530 A1 * | 2/2010 | Guo | H04N 5/2351 348/231.99 |
| 2010/0046060 A1 | 2/2010 | Lee et al. | |
| 2010/0091225 A1 | 4/2010 | Cho et al. | |
| 2010/0271174 A1 * | 10/2010 | Kaminska | B42D 25/29 340/5.86 |
| 2011/0134373 A1 * | 6/2011 | Kim | G02F 1/1334 349/93 |
| 2011/0269364 A1 | 11/2011 | Yoon | |
| 2012/0007860 A1 * | 1/2012 | Hiiro | H04N 13/0409 345/419 |
| 2012/0205435 A1 * | 8/2012 | Woerz | G06Q 10/087 235/375 |
| 2013/0051700 A1 * | 2/2013 | Jo | H04N 5/23254 382/284 |
| 2013/0106092 A1 * | 5/2013 | Holmes | B42D 25/29 283/85 |
| 2013/0278987 A1 * | 10/2013 | Sheng | G02F 1/133514 359/238 |
| 2014/0062882 A1 | 3/2014 | Ozawa et al. | |
| 2014/0231788 A1 * | 8/2014 | Krall | H01L 27/3239 257/40 |

OTHER PUBLICATIONS

Canadian Intellectual Property Office, "Search Report" in application No. PCT/CA2014/050754, dated Nov. 6, 2014, 11 pages.
Wu et al., Angle-Insensitive Structural Colours based on Metallic Nanocavities and Coloured Pixels beyond the Diffraction Limit; Published Feb. 1, 2013; pp. 1-6.
Ebbesen et al., Extraordinary optical transmission through sub-wavelength hole arrays; Letters to Nature; Nature; vol. 391; Feb. 12, 1998; pp. 667-669.
Kumar et al., Printing colour at the optical diffraction limit; nature nanotechnology; Letters; Published online Aug. 12, 2012; DOI: 10.1038/NNANO.2012.128; pp. 557-561; 1-15; Copyright 2010 McMillan Publishing Limited.
Chuo et al., Rapid fabrication of nano-structured quartz stamps; IOP Publishing; Nanotechnology 24 (2013) 055304 (10pp).
Najiminaini et al., Applied Physics Letters; Nano-hole array structure with improved surface plasmon energy matching characteristics; Published online Jan. 24, 2012.
Yokogawa et al., Nano Letters; Plasmonic Color Filters for CMOS Image Sensor Applications; Published Jun. 5, 2012; pp. 4349-4354.

* cited by examiner

NANO-MEDIA INFORMATION CARRIER BASED ON PIXELATED NANO-STRUCTURES COMBINED WITH AN INTENSITY CONTROL LAYER

BENEFIT CLAIM; CROSS-REFERENCE TO RELATED APPLICATIONS

This application claims the benefit under 35 U.S.C. 119(e) of priority to provisional application 61/864,615, filed Aug. 11, 2013, the entire contents of which are hereby incorporated by reference for all purposes as if fully set forth herein.

FIELD

At least some example embodiments relate to producing color images and optically variable graphics using sub-wavelength structures as color pixels.

BACKGROUND

Metallic nano-structures have been demonstrated with unique abilities to manipulate light at the nano-scale. Owing to the coupling of the light with surface plasmons (SP) at the interface between a metal and a dielectric, metallic sub-wavelength structures can display strong color properties which are widely tunable by changing the structure geometries. Ebbesen et al. (U.S. Pat. No. 6,040,936, Mar. 21, 2000) teaches that a metal film having periodic arrays of sub-wavelength apertures shows extraordinary optical transmission and can serve as color filters. Light transmitted through the modulated filters can be combined to display any visual color. Kaminska et al. (U.S. Pat. No. 8,253,536B2, Aug. 28, 2012), having a common co-inventor as the present application, teaches that a metal film having sub-wavelength apertures can be patterned to display a color image which can be applied towards security applications. Kumar et al. (Nat. Nanotechnol. 7, 557, 2012) teaches that sub-wavelength structures comprising apertures and disks can serve as bright color pixels that allow for printing a color image in a resolution comparable with optical diffraction limit. Moreover, Wu et al. (Sci. Rep. 3, 1194, 2013) teaches that nano-cavities in a metal film can display angle-insensitive primary colors.

Nano-grating structures have been used in displaying optical information. Fattal et al. (Nature 495, 348, 2012) teaches that 1-D nano-gratings can be patterned to function as a multi-directional backlight to display multi-view color images. Nano-gratings have been used in authentication and anti-counterfeit applications, such as those demonstrated by Lai et al. (U.S. Pat. No. 7,113,690 B2, Sep. 26, 2006) and Schnieper et al. (U.S. Pat. No. 7,787,182 B2, Aug. 31, 2010; U.S. Pat. No. 8,270,050 B2, Sep. 18, 2012).

Production of color images using sub-wavelength structures can be very useful for applications including security documents and publicity. At the existing systems, the color images are usually produced using the 'bottom-up' methodology, i.e. specific color pixels comprising sub-wavelength structures are positioned at the corresponding locations of the substrate, in accordance with the color image. The fabrication process usually utilizes lengthy procedures and costly techniques, such as electron beam lithography (EBL), and focused ion beam (FIB), for each given color image. Chuo et al. (Nanotechnol. 24, 055304, 2013) teaches that one master stamp can be fabricated for a given color image and large quantity of the color images can be replicated from the same master stamp. The limitation is that each new color image requires a new master stamp and the fabrication process may be time consuming. In many applications, for example, for producing only a few security identity photos for a person's image, making a new master stamp for each person is obviously not practical.

Color photography techniques based on photographic films can be rapid and cost-effective in producing color images. However, color pigments and color film emulsion can lead to inconsistencies and fading over time. The color images produced from conventional film-based color photography are easy to be unscrupulously duplicated, and not suitable for security applications.

Other difficulties with existing systems, methods and techniques may be appreciated in view of the detailed description of example embodiments herein below.

SUMMARY

At least some example embodiments relate to producing visible color images and/or covert information using sub-wavelength structures as color pixels and/or invisible pixels.

In an example embodiment, there is provided a display media which can be referred to as nano-media, including a nano-substrate comprising arrays of nano-structures as subpixels and an intensity control layer to pattern the luminance of the subpixels.

In an example embodiment, the nano-substrate is a metal film having periodic arrays of nano-structures. The nano-structures are designed to allow certain bands of light to be perceived by human eyes and/or to be captured by reader devices.

In an example embodiment, overt color images together with covert infrared images are embedded into a nano-media. There is provided a method and apparatus for the production process of the nano-media.

In an example embodiment, there is provided a display media, including: a substrate layer; a sub-wavelength substrate supported by the substrate layer and including subpixels, each subpixel defined by at least one sub-wavelength structure having at least one specific optical property including a specific optical band, at least two of the subpixels having a different specific optical property; and an intensity control layer to individually control an amount of luminance of each individual of said subpixels in a pattern.

In another example embodiment, there is provided a display media, including a pixel layer with sub-wavelength structures having at least one specific optical property, at least two of the wavelength structures having a different specific optical property; and a photo-sensitive layer which is configured to be optically modified to pattern the luminance of each of the sub-wavelength structures.

In an example embodiment, there is provided a method for producing color images onto a sub-wavelength substrate supported by a substrate layer and including subpixels, each subpixel defined by at least one sub-wavelength structure having at least one specific optical property including a specific optical band, at least two of the subpixels having a different specific optical property, the method including: determining desired overt and/or covert information; and patterning each individual control subregion of an intensity control layer in accordance with the determined desired overt and/or covert information to control an amount of luminance of each individual of said subpixels.

In an example embodiment, there is provided a display media, including: substrate layer; a sub-wavelength substrate supported by the substrate layer and including pixels, each pixel being defined by a subset of subpixels which are defined by at least one sub-wavelength structure having at least one specific optical property including a specific optical band, at least two of the subpixels in each pixel have a different specific optical property; and an intensity control layer to pattern an amount of luminance of the subpixels.

In an example embodiment, there is provided a display media, comprising a pixel layer with sub-wavelength structures having at least one specific optical property, at least two of the sub-wavelength structures having a different specific optical property; and a photo-sensitive layer which is configured to be optically modified to pattern the luminance of each of the sub-wavelength structures.

In an example embodiment, there is provided a method for producing color images onto a display media including a pixel layer with sub-wavelength structures having at least one specific optical property, at least two of the sub-wavelength structures having a different specific optical property; and a photo-sensitive layer which is configured to be optically modified to pattern the luminance of each of the sub-wavelength structures, wherein each subpixel defined by at least one sub-wavelength structure has at least one specific optical transmission band, at least two of the subpixels having different optical transmission bands, the method comprising: determining desired overt information; and calculating an exposure image; and exposing the said exposure image onto the said display media; and chemical processing of the photo-sensitive layer.

BRIEF DESCRIPTION OF THE DRAWINGS

Embodiments will now be described by way of examples with reference to the accompanying drawings, in which like reference numerals are used to indicate similar features, and in which.

DETAILED DESCRIPTION OF EXAMPLE EMBODIMENTS

At least some example embodiments relate to producing visible color images and/or covert information using sub-wavelength structures as color pixels and/or invisible radiation pixels. In an example embodiment, there is provided a display media, including a sub-wavelength substrate comprising arrays of nano-structures as subpixels and an intensity control layer to pattern the luminance of the subpixels.

Figure 1A:
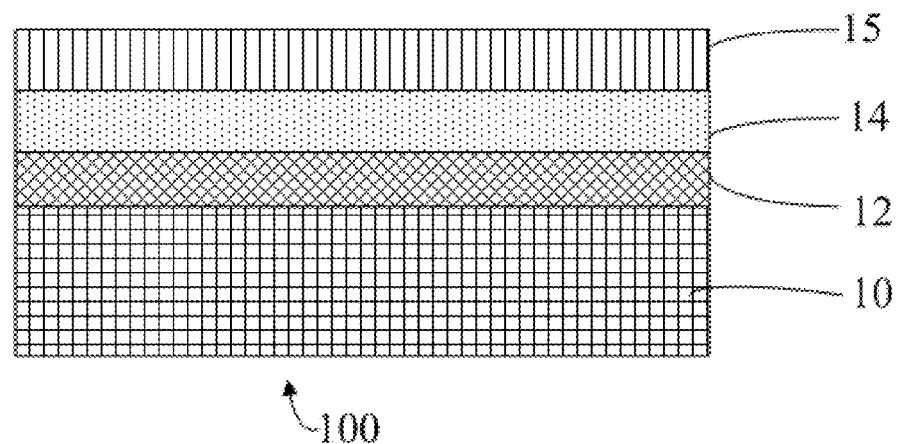
FIG. 1A shows a schematic front sectional view of nano-media in accordance with an example embodiment.

Reference is now made to FIG. 1A, which illustrates a display media 100 which may be referred to as a nano-media 100, in accordance with an example embodiment. Generally speaking, nano-media 100 is comprised of substrate 10 (e.g. substrate layer), sub-wavelength substrate 12 which may be referred to as nano-substrate 12, intensity control layer 14 (ICL) and cover layer 15. The material comprising substrate 10 may be transparent for at least the visible spectrum, and for example is glass or polymer. Nano-substrate 12 is comprised of arrays of subpixels, which can display visible colors and/or invisible bands of light in the infrared transmission and/or ultraviolet range, constructed by nano-structures. Intensity control layer 14 is a layer of material or materials that can individually pattern the luminance of the subpixels on nano-substrate 12. Intensity control layer 14 is optically coupled to the nano-substrate 12. Additional layers may be necessary between substrate 10 and nano-substrate 12, and between nano-substrate 12 and intensity control layer 14, to ensure all the layers can adhere robustly, for example. The cover layer 15 is transparent and serves as a protection layer or supporting layer on top of intensity control layer 14. There may also be certain fiducial marks on at least one of the layers of the nano-media 100, for precisely aligning the nano-substrate 12 with intensity control layer 14 and also for aligning the nano-media 100 to the production equipment. In some example embodiments, the layers on the nano-media 100 are in a different order. For example, the intensity control layer 14 can be beneath the nano-substrate, for example where the output is transmission, scattering or diffraction of the incident field. In some example embodiments, the layers on the nano-media 100 may be modified in accordance with the method for embedding the wanted information.

In at least some example embodiments, reference to sub-wavelength can include a nano-structure or defined aperture, or defined pillar, or defined particle, which is smaller than the wavelength of the electromagnetic field, radiation and/or light incident upon that structure or defined aperture. Similarly, in some example embodiments, any reference to "nano" herein can be similarly modified, configured or applied to other sizes of structures, including pico or smaller, micro or larger, depending on the particular application and/or the incident electromagnetic field.

Figure 1B:
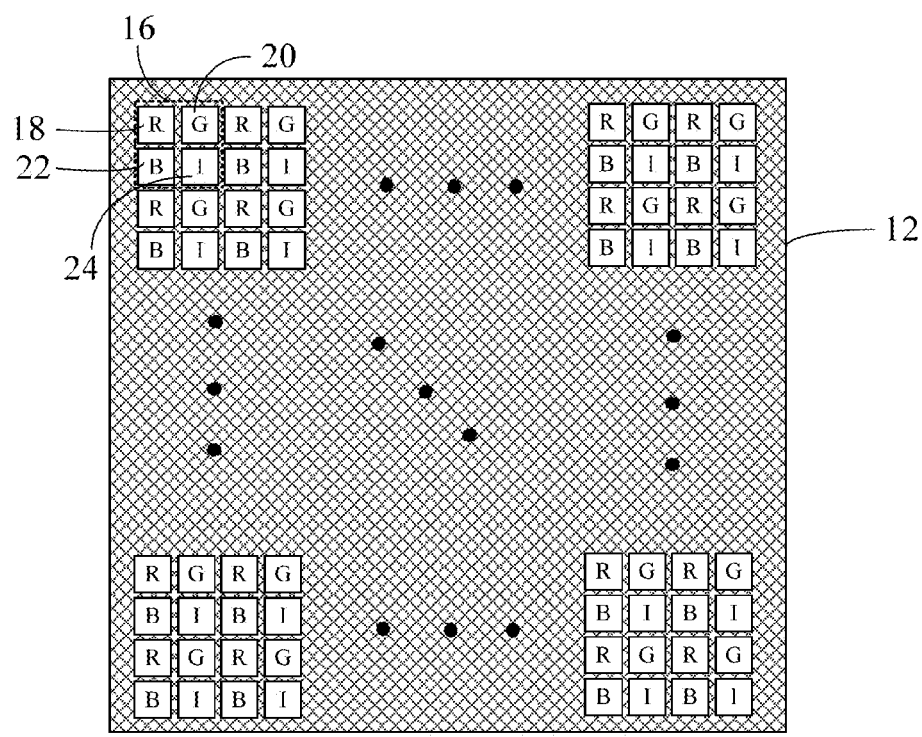
FIG. 1B shows a schematic top view of an example layout of subpixels in a nano-substrate.

FIG. 1B illustrates the mosaics of the subpixels on the nano-substrate 12. Each pixel set 16 is comprised of at least two types of subpixels, which are typically in a same region or proximity. For example, the pixel set 16 shown may include at least three primary color subpixels, e.g. red subpixel 18, green subpixel 20 and blue subpixel 22, following the RGB color system. The name "subpixels" can follow typically nomenclature for foundation subpixels of a color system, but subpixels can also sometimes be referred to as "pixels" in example embodiments. In at least some example embodiments, each pixel set 16 may also contain at least one type of invisible subpixel 24, which is used to carry covert information by giving radiation in infrared and/or ultraviolet bands. The size of each type of subpixel can range from 200 nanometers (nm) to 500 micrometers (μm) and even larger, and different types of subpixels may have the same size or different sizes (e.g. depending on fabrication capabilities, the particular application, the nature of the incident electromagnetic field, etc.). Each subpixel is constructed with sub-wavelength structures. The sub-wavelength structures can be metal nano-hole arrays, metal nano-particles, metal nano-slits, metal nano-cavities, metal nano-hole-nano-particle hybrids or a metal film structured with periodic topography. The metal comprising the sub-wavelength structures may be any metal and for example is aluminum (Al), silver (Ag), chromium (Cr), copper (Cu) or gold (Au). While the pixel set 16 in the example embodiments uses RGB color system for displaying visible colors, it may also be constructed from CMY color system with cyan, magenta and yellow subpixels. The pixel set 16 may include more than 4 types of subpixels, for example. In other example embodiments, the pixel set 16 can include subpixels which are colors that define a color space. The pixel set 16 may also include subpixels having at least two different other optical properties such as different angle-dependence (which may or may not have the same optical band).

At least some of the subpixels in the pixel set 16 are of a respective proximity or distance to each other so that the effective perceivable output can be perceived or viewed as a combined color of the individual subpixels. Therefore, for example, a 50% red pixel and a 50% blue pixel in a pixel set 16 are of a distance or suitably close so that the effective visual output can be viewed as violet/magenta (to a human being, for example).

While the shapes of the subpixels in the example embodiments are illustrated as being square, other shapes are also possible, such as circular or triangular. Within each pixel set 16, the locations of subpixels can have different configurations than the example embodiments, without deviating from the teachings of the present disclosure. The pixel set 16 and/or the subpixels can be arranged in an array, a grid, an aperiodic, and/or a periodic arrangement.

Figure 1C:
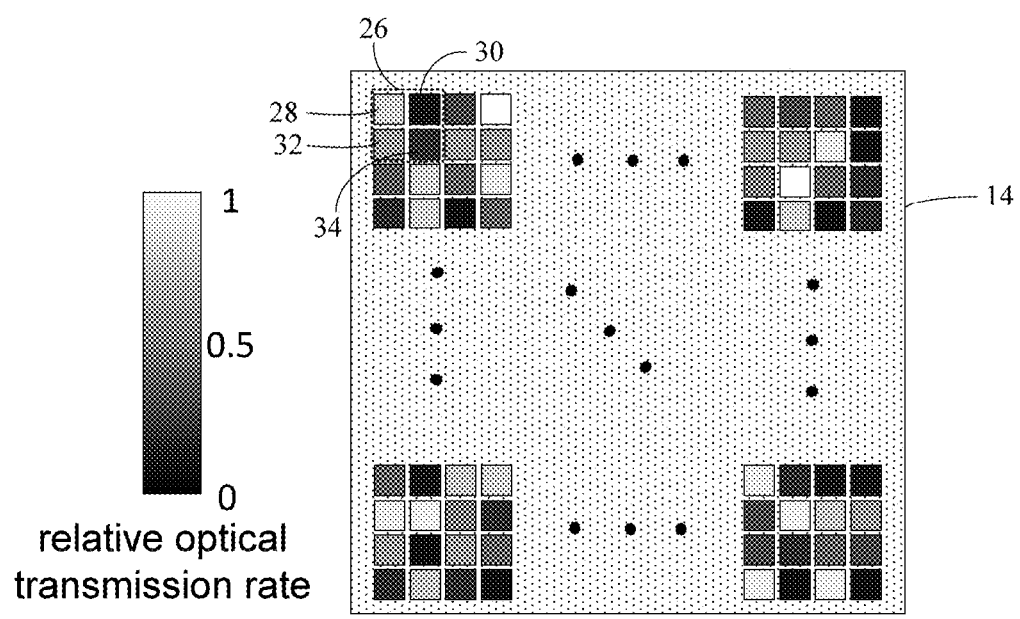
FIG. 1C shows an example of an intensity control layer of the nano-media.

Desired overt information and covert information is embedded onto the nano-media 100 by patterning the intensity control layer 14 to control the luminance of subpixels. FIG. 1C schematically illustrates a patterned intensity control layer 14. A region 26 on the intensity control layer 14 corresponds to the pixel set 16 (FIG. 1B) of the nano-substrate 12. The sub-regions 28, 30, 32, 34 of the region 26 on the intensity control layer 14 will tune the luminance of the subpixels 18, 20, 22, 24 on the nano-substrate 12, respectively. Most given visual colors can be displayed by certain combinations of amount of luminance of the red, green and blue subpixels, similar to the principle of a color liquid crystal display (LCD) or printing processes. Generally speaking, almost any color image can be produced onto the nano-media 100. Since the invisible subpixels can give infrared and/or ultraviolet light, by patterning their luminance using the intensity control layer 14, covert information can be embedded into the nano-media 100.

In FIG. 1C, the amount of tuning or attenuation is shown in a gray-scale for illustrative purposes. By way of example, as shown in FIG. 1C, for the region 26, the subregion 28 is configured to effect approximately 75% luminance, subregion 30 is configured to effect 0% luminance (fully blocked), subregion 32 is configured to effect approximately 50% luminance, and subregion 34 is configured to effect approximately 25% luminance. For example, referring to FIG. 1B, for the pixel set 16 the intensity control layer 14 will therefore tune the luminance of the red subpixel 18 to approximately 75% luminance, the green subpixel 20 to 0% luminance (fully blocked), the blue subpixel 22 to approximately 50% luminance, and the invisible subpixel 24 to approximately 25% luminance. Other subregions of the nano-substrate 12 can provide variable attenuation ranging from 0-100%, for example. In an example embodiment, a particular subregion of the nano-substrate 12 can be configured to provide a gain of greater than 100% for the associated subpixel, for example, by way of further surface plasmon resonance, constructive interference, and/or active gain control.

Figure 2A:
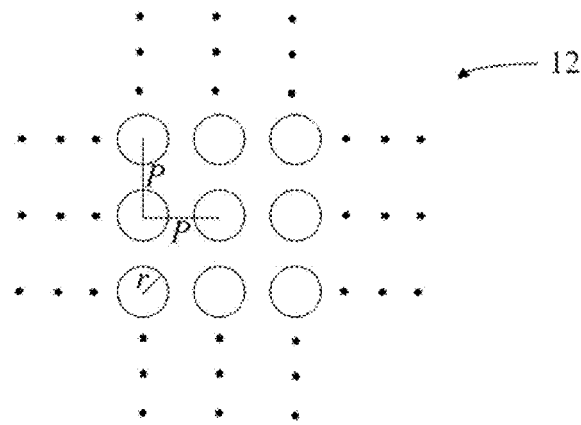
FIG. 2A shows a schematic top view of one nano-grating of the nano-substrate.
Figure 2B:
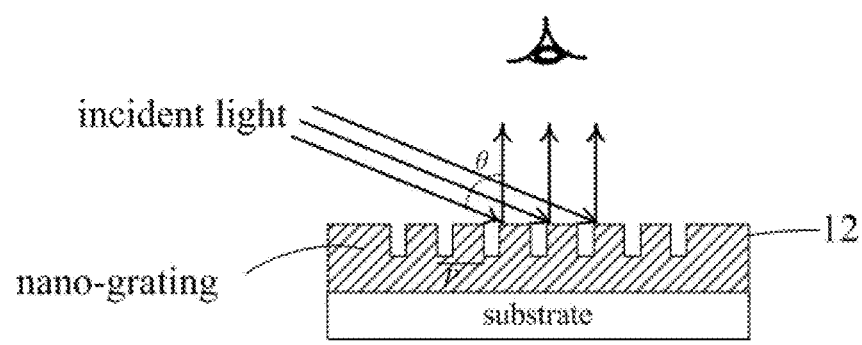
FIG. 2B shows a front sectional view of one nano-grating and the grating effects producing colors in $1^{st}$ reflection grating order.

In the example embodiments, the subpixels are constructed by two-dimensional (2-D) nano-gratings metalized with an aluminum film (50 nm thick). One additional layer of dielectric material may be coated on top of the aluminum film. FIG. 2A shows a schematic top view of a nano-grating, wherein the 2-D nano-grating has sub-wavelength holes arranged in square lattice periodic array. The center-to-center spacing between the neighboring holes is given by P and the radius of the holes by r. In each nano-grating structure the interference of light wave causes angle-dependent light diffraction, giving specific reflection color and transmission color. As shown in FIG. 2B, white light (polychromatic light) is incident at an angle θ relative to the normal of the nano-grating surface. The nano-grating reflects the $m^{th}$ grating order into the direction perpendicular to the substrate surface for light of wavelength λ. The relation that links P with λ is given by Equation (1):

$$P \sin \theta = m\lambda \quad (1)$$

In the example embodiments, white light is incident at 60° (i.e., θ=60°) and the red, green, blue subpixels reflects light with λ equal to 630 nm, 530 nm, and 470 nm, respectively. The $1^{st}$ reflection grating order is chosen, i.e. (m=1), in order to obtain solid colors and to minimize the rainbow effects that exist in many commercial holograms.

Figure 2C:
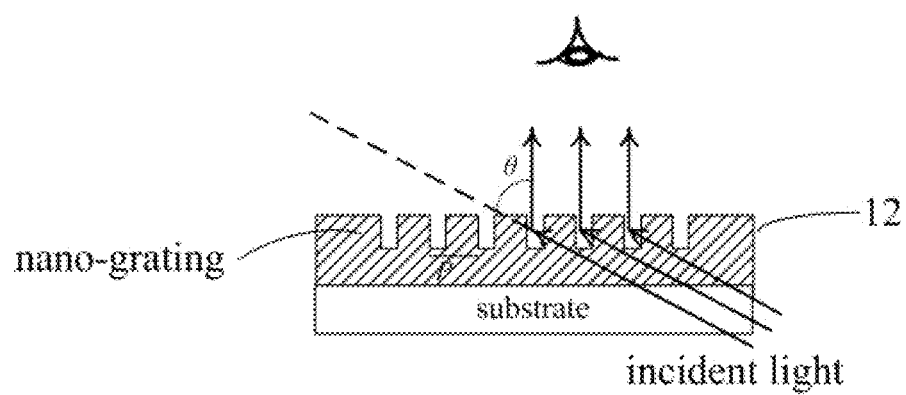
FIG. 2C shows a front sectional view of one nano-grating and the grating effects producing colors in $1^{st}$ transmission grating order.

In the example embodiments, the nano-media 100 is composed of subpixels configured with the following geometrical parameters: red subpixel 18 (P=727 nm), green subpixel 20 (P=612 nm), blue subpixel 22 (P=542 nm) and infrared subpixel 24 (P=981 nm). The radius of the holes ranges from 200 nm to 230 nm. As shown in FIG. 2C, using these chosen periodicities, these subpixels also give the same transmission colors for $1^{st}$ transmission grating order when light is incident from the bottom at an angle of 60° and the transmitted light is viewed from the direction perpendicular to the substrate surface.

Figure 3A:
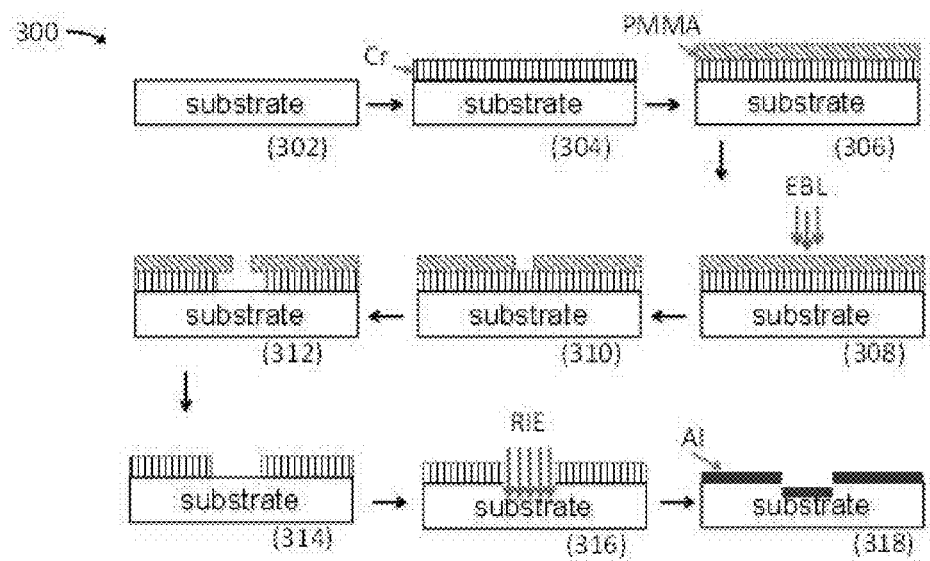
FIG. 3A shows the schematic fabrication process of a nano-substrate.

In order to fabricate the designed nano-gratings with required accuracy, we implemented electron beam lithography (EBL) technique that allows for a resolution of a few nanometers. The fabrication process 300 is schematically shown in FIG. 3A. A quartz substrate (Quartz Scientific, Inc.), provided at event 302, was first cleaned with Nanostrip (KMG Chemicals Inc.). Then a 40-nm-thick chromium (Cr) film was evaporated on top using thermal physical vapor deposition (event 304). Then, a poly(methyl methacrylate) (PMMA A2 950K, MicroChem Corp.) film (event 306), a positive-tone electron-beam photoresist (event 306), was spin-coated on top (thickness of PMMA is about 70 nm). In an EBL process (event 308), patterns of nano-gratings were exposed on the PMMA film using an electron-beam writer (Raith e_LiNE). After EBL exposure, the sample was immersed in a developer containing Methyl isobutyl ketone (MIBK) and Isopropyl alcohol (IPA) (the ratio MIBK:IPA=1:3) for 90 seconds to develop the PMMA film (event 310). Then, the sample was wet etched in a diluted chromium etchant 1020AC (Transene Company, Inc.) for 90 seconds at room temperature (event 312). The dilution ratio of the original etchant with water is 1:1. After wet etching, the PMMA layer was removed in acetone (event 314). Then, at event 316, the sample was etched for 500 nm in depth using reactive ion etching (RIE) to transfer the pattern from the Cr layer into the substrate (RIE machine: Sentech Etchlab 200; gas: $CF_4/O_2$ (25/5 sccm); pressure: 10 mTorr; power: 200 W; etching time: 12 minutes and 30 seconds). After RIE etching, the Cr layer was removed by immersing the sample in chromium etchant 1020AC for 10 minutes and aluminum film (50 nm thick) was evaporated on top of the etched quartz surface using electron beam physical vapor deposition (event 318).

Although quartz substrate is used in the example embodiments, such nano-substrate can be fabricated in massive scale using nano-imprint technique in a roll-to-roll process on large variety of substrate materials, including plastic, paper and metal. Specifically, following the method by Chuo et al. (Nanotechnol. 24, 055304, 2013), we may first fabricate a master stamp with the pre-designed pixelated nano-structures and do a master replication and master recombination to obtain a large area shim made of nickel metal film. Then the shim is loaded into a roll-to-roll process as a rolling drum, and plastic film is rolled onto the shim and imprinted with the nano-substrate pattern via embossing.

Figure 3B:
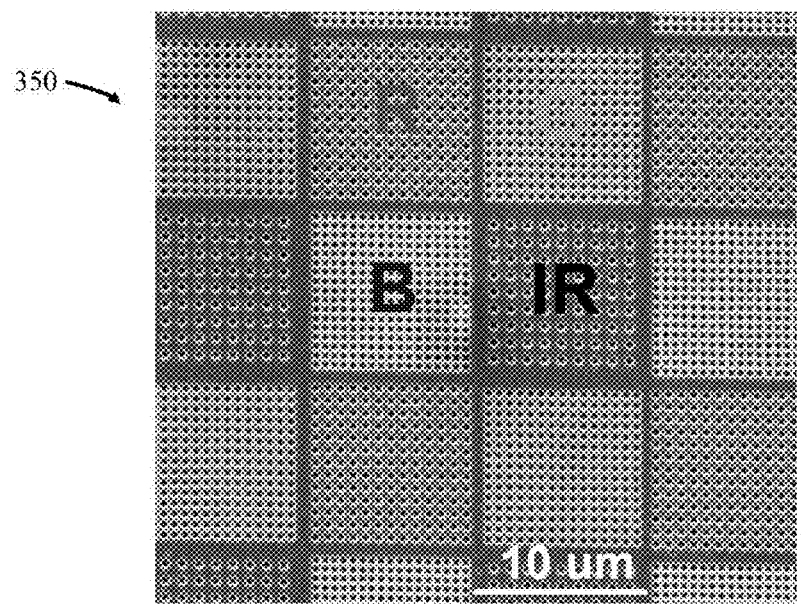
FIG. 3B shows the scanning electron microscope image of a fabricated nano-substrate.

In the example embodiment shown in FIG. 3B, the nano-substrate is fabricated in the size of 4 mm×3 mm on the quartz substrate. FIG. 3B shows the scanning electron microscope (SEM) image 350 with nano-metric resolution to demonstrate the details of the fabricated nano-substrate 12. The subpixel has a size of 10 μm×10 μm and each pixel set 16 has a size of 20 μm×20 μm. Therefore, the fabricated nano-substrate allows for a color image to be produced with 1270 pixels per inch (PPI) resolution.

Figure 4A:
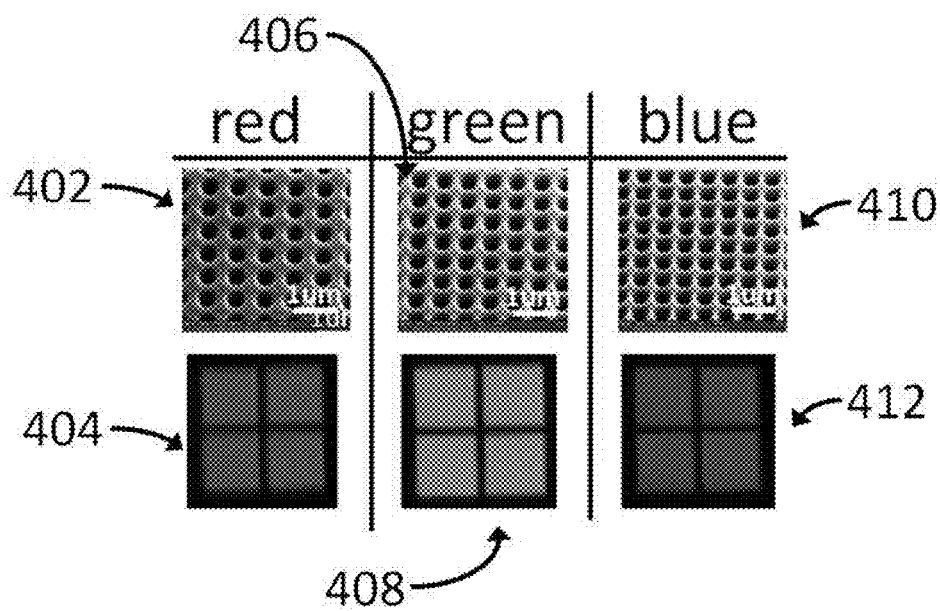
FIG. 4A shows the scanning electron microscope images of the red, green and blue subpixels and their displayed colors captured by an optical microscope.
Figure 4B:
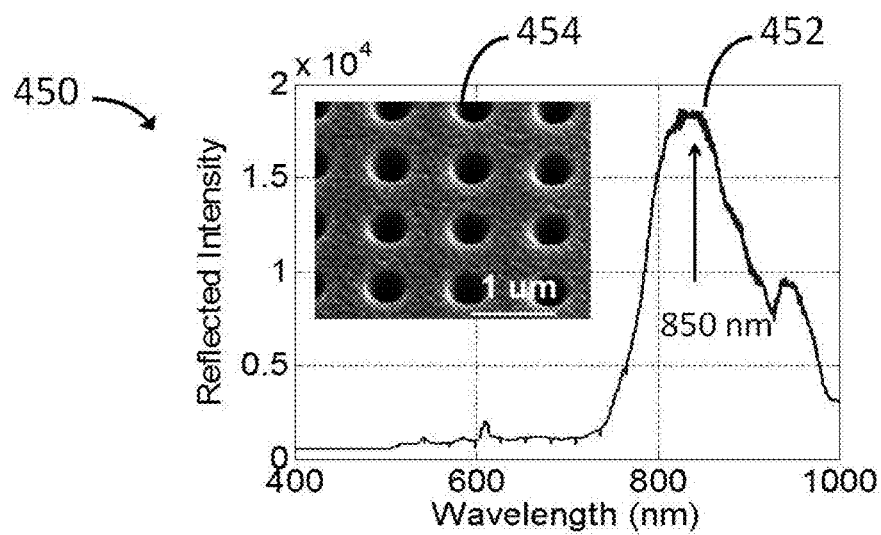
FIG. 4B shows the scanning electron microscope image of an infrared subpixel and the measured reflection spectrum.

FIG. 4A shows the structure details of the nano-gratings captured by SEM (45° images) and the colors of the RGB subpixels in $1^{st}$ reflection grating order captured by an optical microscope. The primary color subpixels display high quality colors. The red SEM image 402 corresponds to the red optical microscope image 404. The green SEM image 406 corresponds to the green optical microscope image 408. The blue SEM image 410 corresponds to the blue optical microscope image 412. FIG. 4B shows the reflection spectrum 450 of the infrared subpixel (per SEM image 454 taken at 45° angle). The reflection peak 452 is around 850 nm. Such a spectral range is not visible to human eyes, but can be captured by many types of camera devices as these devices usually have a color filter array that allows only the transmission of light above 700 nm in wavelength.

Figure 5:
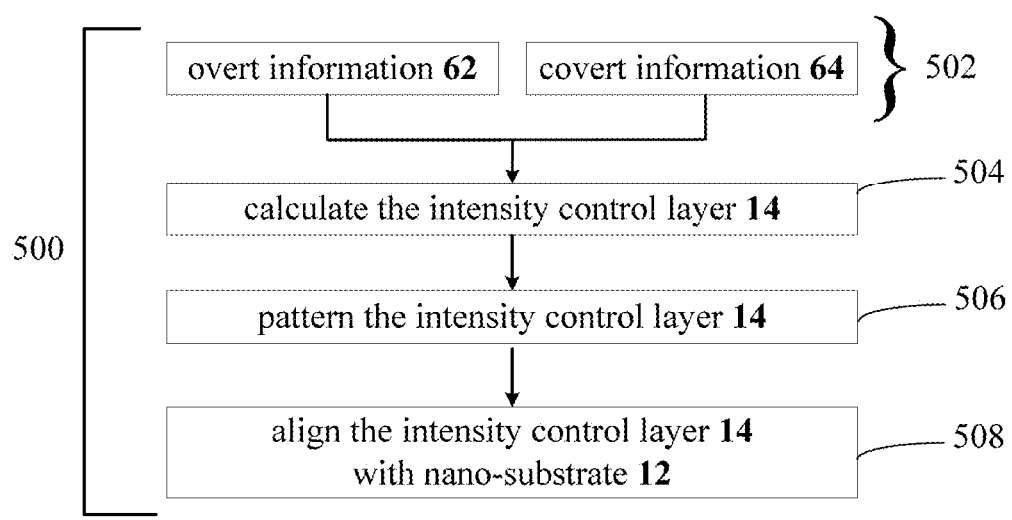
FIG. 5 shows a schematic of a method to embed overt and covert information onto a nano-media.

In order to embed overt and covert information onto a nano-media, an example embodiment includes patterning the intensity control layer 14. FIG. 5 schematically shows a method 500 to embed overt and covert information onto nano-media 100. At event 502, the wanted overt information 62, typically but not restricted to color image, and wanted covert information 64 will be determined. This information can also be determined from a memory, such as an image file, for example. At event 504, the overt and covert information is analyzed by a processor implementing a software program (custom-written codes in MATLAB, MathWorks Inc.) and the intensity control layer 14 is calculated. Then, at event 506, the intensity control layer 14 will be patterned according to the calculation. The patterning techniques can include photo-mask generation, laser writing, photo-lithography and photochemical reaction of the emulsion, etc. The effective optical transmission can be tuned by different sizes of apertures in an optically opaque film, such as a metal film, or different density of attenuation material. The attenuation material can be nanoparticles, such as silver particles or carbon nanotubes, or any other type of material or structure that can tune the luminance. In some example embodiments, each individual subpixel can be controlled by an associated individual control subregion of the intensity control layer 14. Note that while wanted information in the form of individual subpixel control is performed in at least some or all areas of the nano-media 100, without intending to be limiting, this also includes some scenarios of the nano-media 100 production where some other portions or larger areas of the nano-media 100 may be desired to be blacked-out, have the same collective amount of control, press marks and annotations, test zones, fiducial mark zones, or border edges where the information is within the border edges and the exterior is mass blocked out, mass transparent, etc.

At event 508, after patterning the intensity control layer 14, the said layer is aligned with nano-substrate 12 and bonded to fix the information. There are usually matching alignments on both the intensity control layer 14 and nano-substrate 12 to facilitate the precise alignment. Additional physical or chemical treatments may be performed to make the nano-media robust, for example, bonding the protective transparent layer 15 on top of layer 14.

Figure 6:
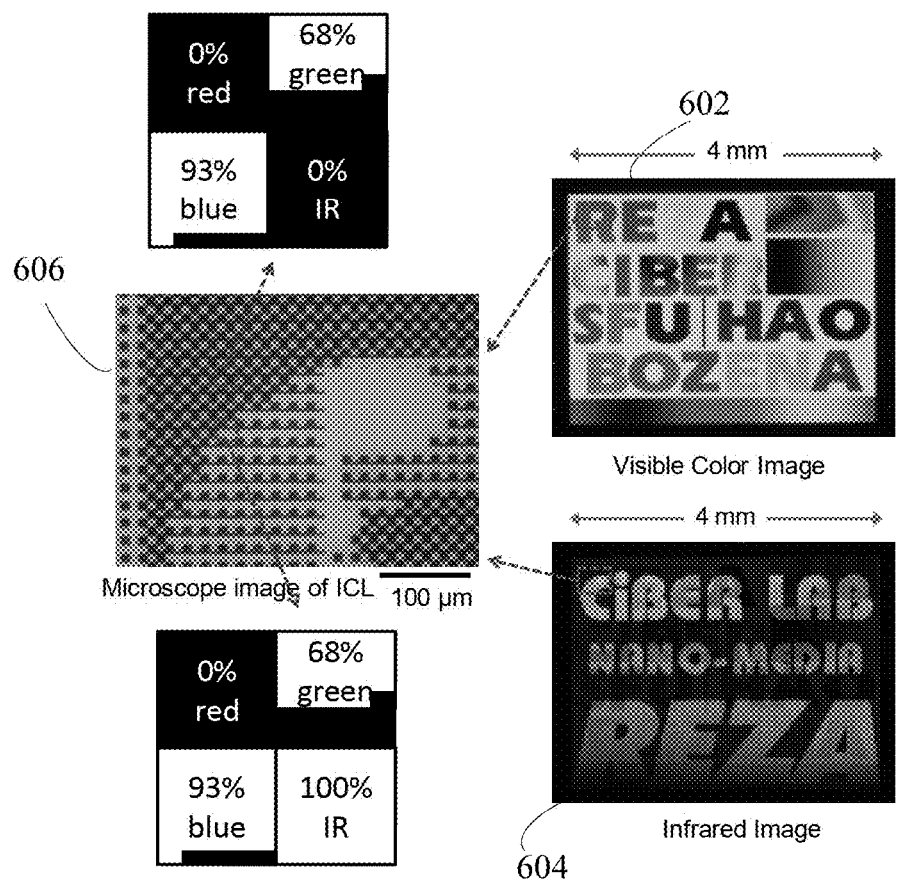
FIG. 6 shows the experimental results of the information embedded into a nano-media.

In some example embodiments, one intensity control layer 14 based on binary chrome photo-mask was fabricated according to the visible color images and the covert information. The chrome photo-mask, with the designed intensity control layer pattern, was produced with 1 micrometer resolution by Toppan Photomasks Inc. By accurately aligning the intensity control layer with the nano-substrate using a mask aligner (ABM mask aligner), a nano-media with combined visible color image and covert information was obtained. FIG. 6 shows experimental results of the produced color images on the nano-media, as well as the embedded covert information. The images were taken from the $1^{st}$ reflection grating order of the nano-media, i.e., polychromatic light was incident from an angle of 60° and the images were collected from the same side of the incident light from the direction perpendicular to the sample surface, using the configuration shown in FIG. 2B. The color image 602 was captured using a digital SLR camera (Canon 50D), a 50 mm lens (F/22) and a lens extension tube. The infrared image 604 was captured using a telecentric lens (Edmund Optics, Gold Series 0.5X), a long pass filter (cut-off wavelength 800 nm) and a CMOS color camera (Sumix SMX-10M3C). In the color image 602, the colors displayed in the nano-media match the original figures very closely which proves nano-media to be an effective media for displaying overt information. Since the produced color image has a resolution of 1,270 PPI, human eyes cannot percept the pixelation on the substrate. It should be noted that, the pattern of infrared subpixels does not noticeably affect the visible color image. From the infrared images in image 604, the covert information can be clearly resolved by an infrared reader. Under the 4 mm×3 mm area, texts, gray-scale images and QR codes can all be embedded into the nano-media and can be read without difficulties. In other samples, we actually embedded QR code and gray-scale ID photo images as the covert information into the nano-media and the hidden image was clearly retrieved by the infrared reader.

The microscope image 606 shows the configuration of the intensity control layer for displaying the captured color image 602 and the infrared image 604. The intensity control layer being used is actually a binary chrome photo-mask. In designing the photo-mask, the subregion on the photo-mask corresponding to each subpixel (10 µm×10 µm) on the pixel layer 12 was divided into 100 squares and each square is in the size of 1 µm×1 µm. The effective optical transmission rate for the subpixel is determined by the percentage of the open squares. Therefore, 100 intensity levels can be produced for each subpixel. For example, as shown in FIG. 6, the cyan letter "R" is given by [R, G, B]=[0, 172, 236], with 24-bit color (each primary color is given by an 8-bit binary integer). Such a color corresponds to 0% red, 68% green, 93% blue. Therefore, as shown in the inset image 606, for the red, green and blue subpixel, there are 0, 68 and 93 squares open respectively on the corresponding subregion in the intensity control layer. The overt cyan letter "R" overlaps with the infrared letter "C". As seen from the insets of the image 606, the intensity control layer on top of the infrared subpixels on the subregion inside the letter "C" allows 100% transmission of infrared light but blocks the transmission of infrared light outside the letter "C". Therefore, a bright letter "C" becomes apparent relative to the dark background, as shown in the infrared image 604.

It should be noted that the colors displayed by the subpixels depend on the light incident angle and the viewing angle, due to the grating nature. In our experiments (not shown here), we clearly observed the color-shifting effects from the sample shown in FIG. 6, by tilting the light incident angle and/or viewing angle.

Figure 7A:
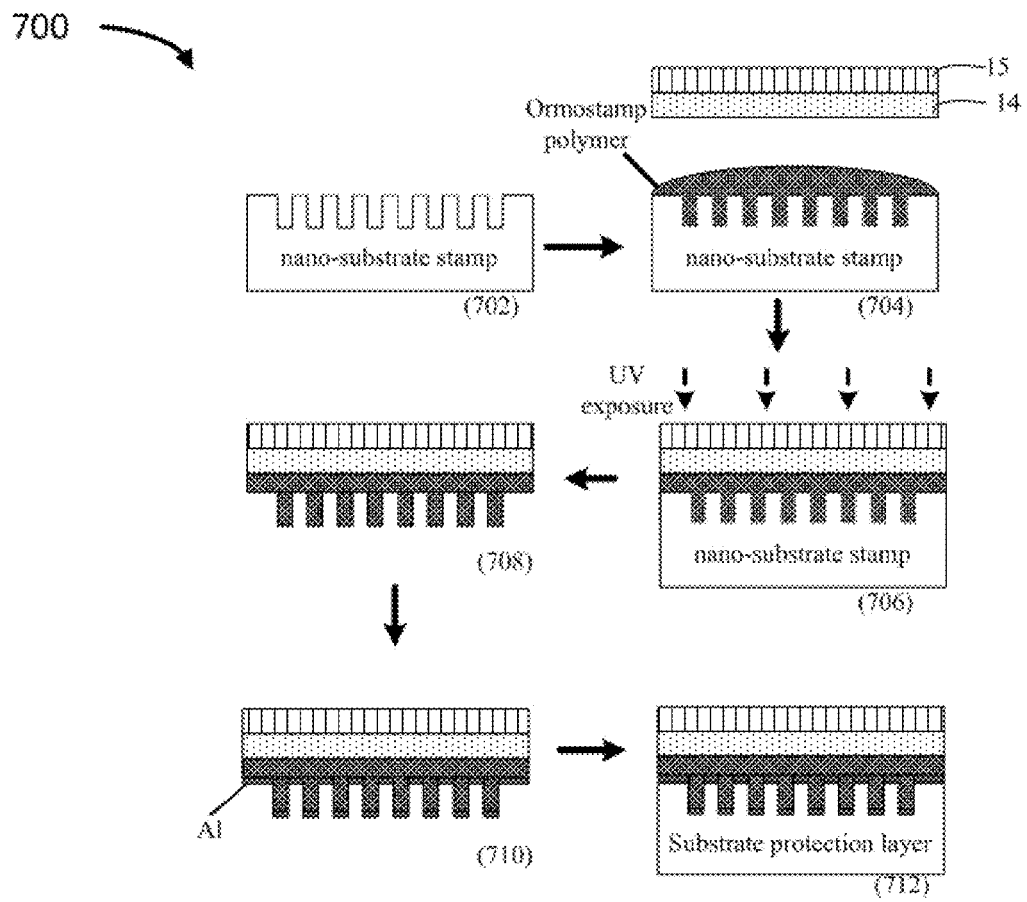
FIG. 7A shows a schematic of a method to directly imprint nano-structures onto the surface of intensity control layer.

Reference is now made to FIG. 7A, which schematically shows a method 700 to directly imprint nano-substrate layer 12 onto the intensity control layer 14. The nano-substrate stamp including patterns of nano-gratings was fabricated using the method 300 and the nano-substrate stamp has the same subpixel layout as the intensity control layer. At event 702, an anti-adhesive coating was first applied on the surface of the nano-substrate stamp. 1H,1H,2H,2H-perfluorodecyl-trichlorosilane ($CF_3$—$(CF_2)_7$—$(CH_2)_2$—$SiCl_3$ or FDTS), ordered from Alfa Aesar Canada, was used as the anti-adhesive coating material. To coat the anti-adhesive layer, the nano-substrate stamp was first cleaned with oxygen plasma for 5 minutes (gas: $O_2$; pressure: 280 mTorr; power: 300 W) and then placed inside a desiccator. Then, a 10 µL droplet of FDTS was dropped in a petri dish inside the same desiccator and the desiccator was connected to vacuum condition for 30 minutes. Then a self-assembled monolayer (SAM) of FDTS was formed on the surface of the stamp. At event 704, the intensity control layer 14 together with the top layer 15 was mounted inside a mask aligner (ABM mask aligner) as a photomask and the nano-substrate stamp was mounted on the sample stage (i.e., the nano-substrate stamp is under the intensity control layer). Then a 25 µL droplet of OrmoStamp (Micro Resist technology GmbH) was dropped on the surface of the nano-substrate stamp. Under the microscopes of the mask aligner, the subpixel pattern on the nano-substrate was precisely aligned to the intensity control layer. After alignment, the nano-substrate stamp was brought into tight contact with the intensity control layer 14, with the OrmoStamp sandwiched between the two said layers. At event 706, UV exposure was applied to cure the OrmoStamp (suitable dose 1000 mJ/cm$^2$). After UV exposure, the sample was baked at 130° C. for 10 minutes to allow the Ormo-Stamp to be completely cured. At event 708, the nano-substrate stamp was separated from the intensity control layer, leaving the nano-structures on the surface of intensity control layer. At event 710, a thin aluminum film (50 nm thick) was evaporated on the surface of the imprinted nano-structures using electron beam physical vapor deposition. At event 712, a substrate protection layer 10 was bonded to the nano-structures using two steps. Firstly, a PMMA (PMMA A6 950K, MicroChem Corp.,) layer was spin-coated on top of the nano-structures and baked at 150° C. for 10 minutes. The thickness of PMMA film is around 1 micrometer. Then, a transparent plastic Poly-Ethylene Terephthalate (PET) film (thickness around 0.5 mm) was glued to the PMMA layer using a UV-curable glue, PAR-LITE 4116 (Parson Adhesives, Inc., UV dose 180 mJ/cm$^2$ to cure), to serve as the substrate support.

Figure 7B:
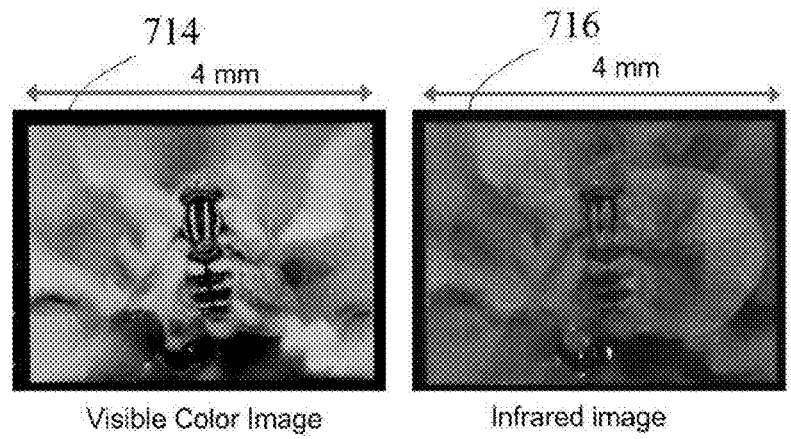
FIG. 7B shows the experimental results of a nano-media produced by directly imprinting the nano-structures onto the surface of intensity control layer.

FIG. 7B shows the experimental results of the nano-media produced by directly imprinting nano-structures onto the surface of the intensity control layer. The images were taken from the 1$^{st}$ transmission grating order of the nano-media, i.e., polychromatic light was incident from an angle of 60° from the back side of the nano-media and the images where collected from the front side from the directional perpendicular to the sample surface, using the configuration shown in FIG. 2C. The visible color image 714 demonstrates the very details of the bee on the flower with bright colors. The infrared image 716 is a negative gray-scale image of a person's ID photo. Although there is noticeable interference between the visible and infrared image components, the details of the covert photo can still be retrieved by digitally enhancing and processing the image.

Although in the example embodiments 2-D arrays of subpixels are used in the nano-media, the presented approach can also be generalized and applied to nano-media containing only 1-D array of subpixels, for example, 1-D array of subpixels on a polymer thread pre-patterned with 1-D intensity control layer.

It may be appreciated that, in some example embodiments, the pattern is customized primarily or solely by the intensity control layer 14 while the sub-wavelength substrate 12 is generic to the pattern. In other words, a stock of the sub-wavelength substrate 12 and substrate layer 10 can be mass-produced, such as with one master stamp. The wanted image can then be customized by patterning primarily the intensity control layer 14. In an example embodiment, a number of sets of the sub-wavelength substrate 12 (with the substrate layer) can be mass-produced. For example, a stock of RGB substrates and CMY substrates can be mass-produced, and the appropriate one can be selected based on the desired scenario of the nano-media 100. The stock substrate can also further include the invisible radiation subpixels. In addition, different densities, resolutions, pixel layouts, shapes, angle-dependence, color schemes, etc. may be generic (mass produced) and selected based on the particular application or budget. For example, a generic stereogram substrate having at least two viewing angles, or an animation substrate can be selected.

In an example embodiment, the intensity control layer 14 material or materials have optical properties which are generally agnostic to the specific optical bands of the sub-pixels, and/or the viewing angle. In other words, a specified amount of attenuation by the intensity control layer would generally equally affect any type of sub-pixel. This is best illustrated in the relative intensity bar shown in FIG. 1C. The intensity control can be achieved via different materials and methods. For example, it can be based on attenuation materials such as particles, photographic emulsions. It can also be based on micro-scale apertures patterned on each subpixel, the size of the said apertures are tuned to provide the desired effective relative intensity. However, if an intensity control layer material or type is used which has variable dependence on the specific optical bands and/or angle, this can be readily accounted for when calculating or fabricating the amount of control or type for the color or optical properties of that particular sub-pixel.

In some example embodiments, the size of the nano-media may range from a few millimeters to a few meters. Principally, the size of the nano-media is only restricted by the fabrication technique. To produce a color image onto the nano-media, the apparatus may include components to allow each subsection of the intensity control layer 14 to be patterned serially or in parallel. In the example embodiments, the nano-media can be produced onto a roll of flexible film and may be directly used as a photographic film in a film camera.

Modifications can be made to method 500, where the alignment steps are not necessary. By properly designing the nano-substrate 12, the optical properties of the nano-substrate could allow the desired information to be embedded directly on to the intensity control layer 14. In some example embodiments, both the nano-substrate 12 and the intensity control layer 14 are pre-provided together as a film, exposure system, or can have attenuation elements accurately inserted thereon, with or without fiducial marks, described in greater detail herein.

In an example embodiment, a tangible optical storage medium for information storage and information communication includes the nano-media 100. The tangible optical storage medium can encode information as color patterns, black/white patterns, covert patterns, and/or binary data, produced onto the display media. By way of non-limiting example, the pattern can include an image, barcode, 2-D barcode, QR barcode, color barcode, High Capacity Color Barcode (HCCB) developed by Microsoft™ and defining triangular clusters of pixels, or any combination or sub-combination thereof, etc. A color barcode system can be produced, wherein the color or invisible radiation of a pixel or a group of pixels can be used to store information, typically at least binary information. In addition, a change in viewing angle can result in a different pattern and associated information being communicated, in some example embodiments. The information can be communicated and be read by a recipient or a reader, for example. The embedded information can be read by human eyes and/or by an imaging device which may be a stand-alone device or a component attached to a mobile device. Note that conventional printed barcodes can be subject to fading, inconsistencies, readily unscrupulously copied, etc.

In some example embodiments, the produced color images may only be able to be correctly viewed from a certain angle and may require specific illumination conditions and/or assisting devices. Such a feature may be ideal for security applications, and may not be easily unscrupulously copied. In some example embodiments, the nano-media may include an active layer acting as a light source to illuminate the produced image and may also include functional layers to supply energy for the light source. Other sources other than white light can be used as the incident light in other example embodiments, such as light having a different specified spectrum or specified spectrum range, filtered light, coherent light, or invisible radiation such as ultraviolet light or infrared light, etc.

In some example embodiments, the nano-media may be simplified for producing images with simple colors. For example, a nano-media may contain only red and green primary color pixels and can be used to produce a color image that only contain colors presentable by mixture of red and green colors.

In some example embodiments, the nano-media may include more types of subpixels to extend its functionality. For example, one can design the subpixels that can include multiple infrared subpixels and/or ultraviolet subpixels. Such functionality allows multi-spectral information to be stored onto the nano-media.

In some example embodiments of the intensity control layer, at least one sub-wavelength structure is configured to display the respective specific optical band due to: transmission of incident light; or reflection of incident light; or diffraction of incident light; or scattering of incident light.

In some example embodiments, the nano-media may have the intensity control layer being a static layer. For example, in such example embodiments a power source may not be required to control the intensity control layer, but rather it is fabricated or uses exposure methods to produce the desired intensity control. In an example embodiment, all of the layers and the sub-wavelength substrate are static layers. The intensity control layer can also be an active layer which can be dynamically controlled to produce the desired color image or information.

In the above-described embodiments, 2-D nano-gratings metalized with metal film were used as subpixels. Modifications can be easily made to include dielectric nano-gratings as subpixels, such as high refractive index (HRI) film structured with periodic topography. Due to the diffraction effects, the dielectric nano-structures of various geometries can display variable colors, in accordance with the teaching of Knop et al. (U.S. Pat. No. 4,484,797, Nov. 27, 1984). The methods and apparatus in example embodiments can also be used to embed overt and covert information onto a nano-media comprised of dielectric nano-structures.

In the above-described embodiments, $1^{st}$ order reflection grating order and $1^{st}$ order transmission grating order have been used to display color using the 2-D nano-gratings. Using specially engineered 2-D nano-gratings, such as metal film having periodic arrays of sub-wavelength apertures, referred to as metal nanohole arrays (NHAs), high quality colors can also be obtained from the $0^{th}$ order transmission, i.e. the incident light and propagating light are collinear (normal transmission), owing to the extraordinary optical transmission effects, in accordance with the teaching of Ebbesen et al. (U.S. Pat. No. 6,040,936, Mar. 21, 2000).

Example embodiments of an apparatus in the form of an example nano-media embodied as a sub-wavelength photopaper, also referred to as nano-photopaper, along with associated methods, will now be described. The nano-photopaper can be configured or suited to produce or manufacture, for example, the described nano-media 100 of at least some example embodiments, containing overt images and/or covert information. Such example embodiments can be configured or suited to generate the intensity control layer, for example. Such example embodiments may also include at least one pixel or subpixel in the invisible spectrum to embed covert information.

In some example embodiments, there is provided an apparatus which can be referred to as nano-photopaper, including a pixel layer comprising arrays of sub-wavelength structures as primary color pixels and a photo-sensitive layer to pattern the luminance of the primary color pixels.

In some example embodiments, the pixel layer is a metal film having nanohole arrays. The sub-wavelength structures are tuned to allow broad-band (bandwidth around 100 nm in wavelength) transmission of red, green and blue colors and can also have narrow-band filtering properties at certain wavelengths. The sub-wavelength structures may also be tuned to transmit invisible radiation such as infrared or ultraviolet.

In an example embodiment, color images are produced onto the nano-photopaper using the broad-band transmission through the primary color pixels which serve as built-in color filter arrays, and the photo-sensitive layer is patterned by light that transmits through the pixel layer in accordance with the desired color image and/or covert information. There is provided a method and apparatus for facilitating the production process.

Figure 8A:
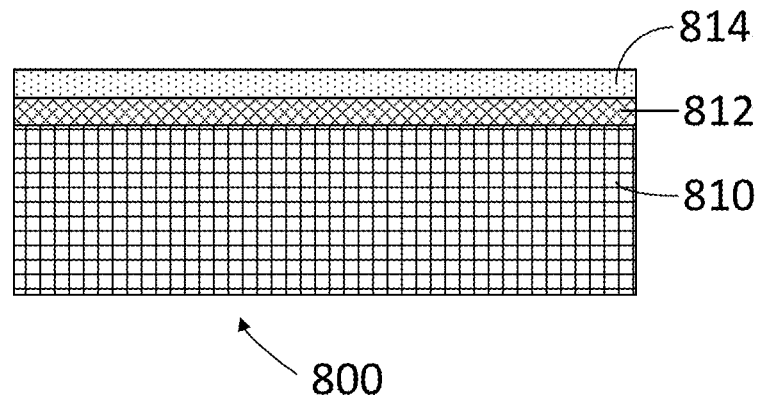
FIG. 8A shows a schematic front sectional view of an example nano-media embodied as a nano-photopaper, in accordance with another example embodiment.

Reference is now made to FIG. 8A, which shows a sub-wavelength photopaper 800, also referred to as nano-photopaper 800, in accordance with an example embodiment. Generally speaking, nano-photopaper 800 is comprised of substrate 810 (substrate layer), pixel layer 812 (sub-wavelength substrate) and photo-sensitive layer 814. The material comprising substrate 810 is transparent for the visible spectrum, and for example is glass or polymer. Pixel layer 812 is comprised of arrays of pixels (sometimes referred to as subpixels if following a particular color system) such as primary color pixels constructed by sub-wavelength structures, and may also include invisible radiation pixels (not shown here). Photo-sensitive layer 814 is comprised of a layer of photo-sensitive material that can pattern the luminance of the primary color pixels. Additional layers may be necessary between substrate 810 and pixel layer 812, and between pixel layer 812 and photo-sensitive layer 814, to ensure all the layers can adhere robustly. There may also be a protection layer or supporting layer on top of photo-sensitive layer 814 to facilitate the production of color images. There may also be certain fiducial marks on at least one layer of the nano-photopaper 800, for the purpose of aligning the nano-photopaper 800 in the production equipment. The layers on the nano-media 800 can be in a different order. For example, this can vary depending on where the output transmission is intended when compared to incident field. In some example embodiments, the layers on the nano-photopaper 800 may be modified in accordance with the method for producing color images.

In accordance with an example embodiment, photo-sensitive layer 814 is comprised of an emulsion of a gelatin film containing at least one type of silver halide, for example silver bromide. Upon exposure to light and chemical development, the silver halide decomposes into silver particles that will attenuate the light and tune the luminance of the subpixels. While the photo-sensitive layer 814 in the example embodiments uses silver halide, other materials may also be used, such as photo-refractive polymers, without deviating from the teaching of the present disclosure.

Figure 8B:
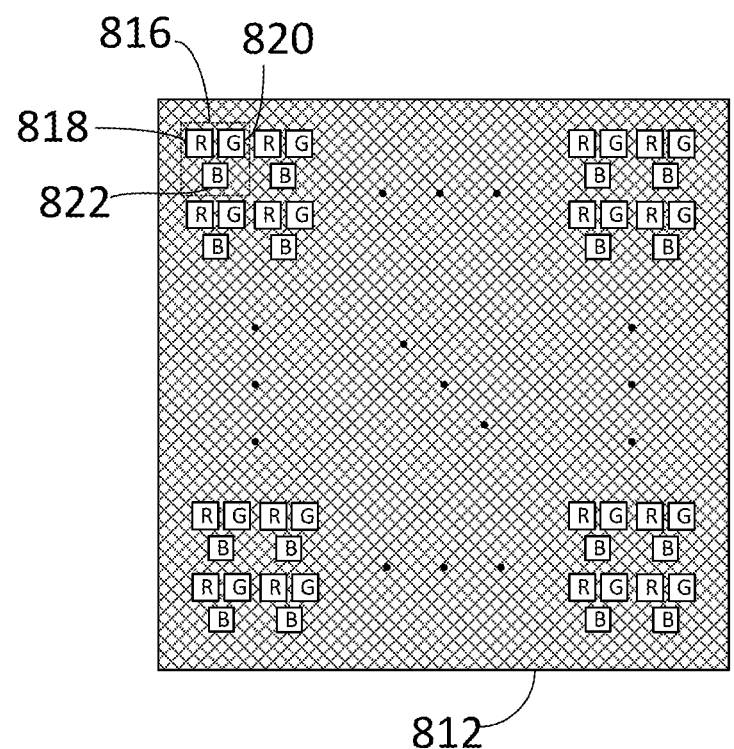
FIG. 8B shows a schematic top view of primary color subpixels in a pixel layer of the nano-photopaper.

FIG. 8B illustrates the mosaics of the primary color pixels on the pixel layer 812. Each pixel set 816 is comprised of at least two types of pixels (sometimes called subpixels), which are typically in a same region or proximity. For example, the pixel set 816 shown may include at least three primary color pixels, e.g. red pixel 818, green pixel 820 and blue pixel 822, following subpixels for the RGB color system. Invisible radiation pixels may also be used, in some example embodiments (not shown here). The size of each type of pixel is larger than 200 nanometers, and different types of pixels may have the same size or different sizes. Each pixel is constructed with sub-wavelength structures that give $0^{th}$ order transmission color. The sub-wavelength structures can be metal nano-hole arrays, metal nano-particles, metal nano-slits, metal nano-cavities, metal nano-hole-nano-particle hybrids or a metal film structured with periodic topography. The metal comprising the sub-wavelength structures may be any metal and for example is aluminum, silver, chromium, copper or gold. While the pixel set 816 in the example embodiments uses RGB color system, it may also be constructed from CMY color system with cyan, magenta and yellow pixels. The pixel set 816 may include more than 3 types of primary color pixels and may also include angle-dependent primary color pixels. While the shapes of the primary color pixels in the example embodiments are rectangular, other shapes are also possible, such as circular or triangular. Within each pixel set 816, the locations of three primary color pixels can have different configurations than the example embodiments, without deviating from the teaching of the present disclosure.

A color image is formed onto the nano-photopaper 800 by exposing the photo-sensitive layer 814 with a certain image to pattern the luminance of primary color pixels. Most given visual colors can be displayed by certain combinations of luminance of the red, green and blue pixels, similar to the principle of a color liquid crystal display (LCD) or printing processes. Generally speaking, almost any color image can be produced onto the nano-photopaper 800. At least some of the pixels in the pixel set 816 are of a respective proximity or distance to each other so that the effective perceivable output can be viewed as a combination of the individual subpixels. Therefore, for example, a 50% red pixel and a 50% blue pixel in a pixel set 816 are of a distance or suitably close so that the effective perceivable output can be perceived as violet/magenta (to a human being, for example).

In addition or as an alternative, a covert image can be produced onto the nano-photopaper 800 by patterning of invisible pixels (not shown here) located on the pixel layer 812 and by including a photo-sensitive layer that is sensitive to invisible radiation (not shown here).

Figure 9A:
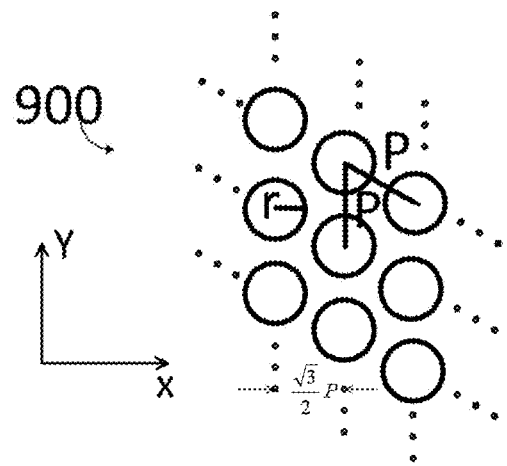
FIG. 9A shows a schematic top view of triangular lattice metal nanohole arrays.
Figure 9B:
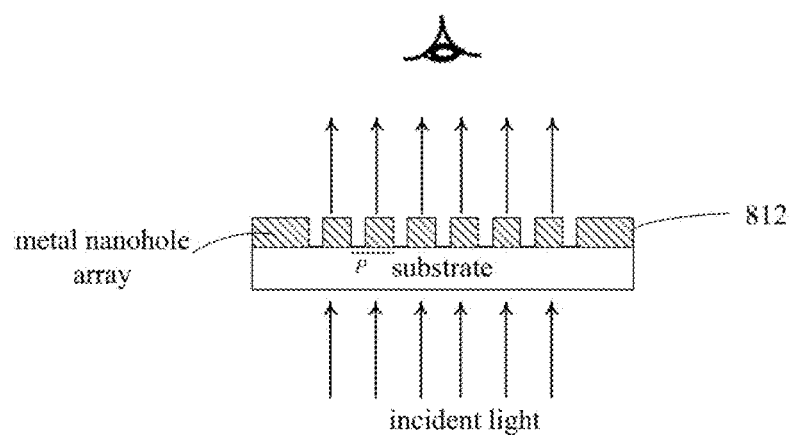
FIG. 9B shows a front sectional view of a metal nanohole array and the extraordinary optical transmission effects.

In some example embodiments, the primary color pixels are constructed using metal NHAs in a 100-nm-thick aluminum film. One layer of dielectric material may be coated on top of the aluminum film and the said dielectric material may fill inside the nanoholes to achieve index matching in order to improve the transmission properties, in accordance with the teaching of Najiminaini et al. (Appl. Phy. Lett. 100, 043105, 2012). FIG. 9A shows a schematic top view of the NHA 900, wherein the sub-wavelength holes are in triangular lattice with spacing P and radius r, following the teaching of Yokogawa et al. (Nano. Lett. 12, 4348, 2012). FIG. 9B schematically shows how the NHAs filter light due to the extraordinary optical transmission effects: the incident light wave couples to the surface plasmon mode of the metal film via the periodic array of nanoholes, and on the other side, light is diffracted out to propagate ($0^{th}$ order transmission). For light incident in the direction normal to the film surface, the transmission of one NHA depends on both the P and r, and the color therefore can be tuned by changing the structure geometries, in accordance with the teaching of Ebbesen et al. (U.S. Pat. No. 6,236,033 B1, May 22, 2001). The transmission peak wavelength λ for the (i, j) surface plasmon mode is given by Equation (2)

$$\lambda(i, j) = P \frac{1}{\sqrt{i^2 + j^2}} \sqrt{\frac{\varepsilon_m \varepsilon_{\mathit{eff}}}{\varepsilon_m + \varepsilon_{\mathit{eff}}}} \quad (2)$$

where $\varepsilon_m$ and $\varepsilon_{\mathit{eff}}$ is the dielectric constant of aluminum and surrounding medium respectively.

Figure 9C:
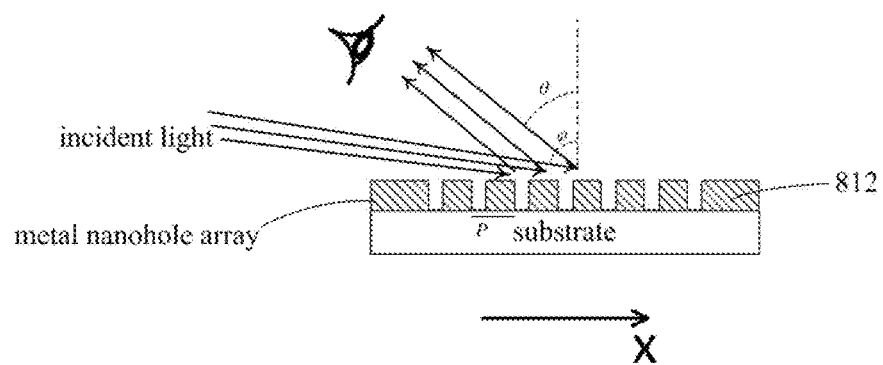
FIG. 9C shows a front sectional view of a metal nanohole array and the grating effects that produces reflective colors.

The correct primary colors can also be obtained from the corresponding subpixels under reflection mode under grating effects. As shown in FIG. 9A, the metal NHAs in hexagonal lattice can be considered as a 1-D grating with the grating periodicity equal to $\sqrt{3}P/2$ along the X direction. As shown in FIG. 9C, for light incident along the X direction at an incident angle φ, the wavelength that will be reflected to the angle θ, is given by Equation (3).

$$\frac{\sqrt{3}}{2} P(\sin\varphi + \sin\theta) = m\lambda \quad (3)$$

For the chosen metal NHA configurations, only $1^{st}$ order reflection mode can function, i.e. m=1. When light is incident at a grazing angle (φ=80°), the red, green and blue colors can be obtained from the red, green and blue NHA respectively, when the viewer is observing from an angle about 60° (θ=60°).

Figure 10A:
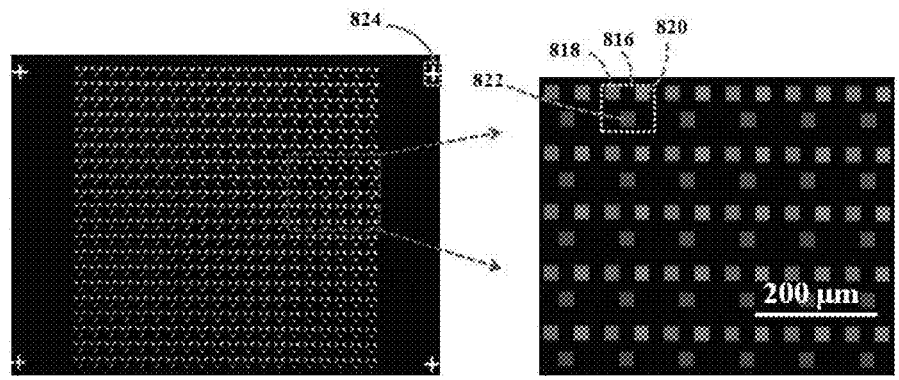
FIG. 10A shows the normal transmission colors from a nano-substrate comprising metal nanohole arrays captured by a transmission microscope.

FIG. 10A shows the transmission microscope image of the pixel layer of an example embodiment. The pixel set 816 is in the size of 100 µm×100 µm. The red subpixel 818, green subpixel 820 and blue subpixel 822 are in the same size of 25 µm×25 µm. In each pixel set 816, the center-to-center distance between subpixels is 50 µm. Alignment mark 824 on the pixel layer 812 is used to align the nano-photopaper 800 to the exposure system and/or to align the pixel layer 812 to the photo-sensitive layer 814, if necessary.

The nano-substrate shown in FIG. 10A allows for a color image to be produced with resolution of 254 PPI. It should be noted that, the maximum resolution of the image that can be produced from a nano-media is determined by the smallest possible subpixels with good transmission colors that can be achieved on the nano-substrate. The challenge is that, as the size of a subpixel is scaled down to the extent comparable to the wavelength of light, its color properties deteriorate (Nano Letters 12, 4349, 2012). By engineering the nano-structures, the size of the subpixels can potentially reach about 1 micrometer and still maintains the color properties, which implies a possible resolution of 12,700 PPI.

Figure 10B:
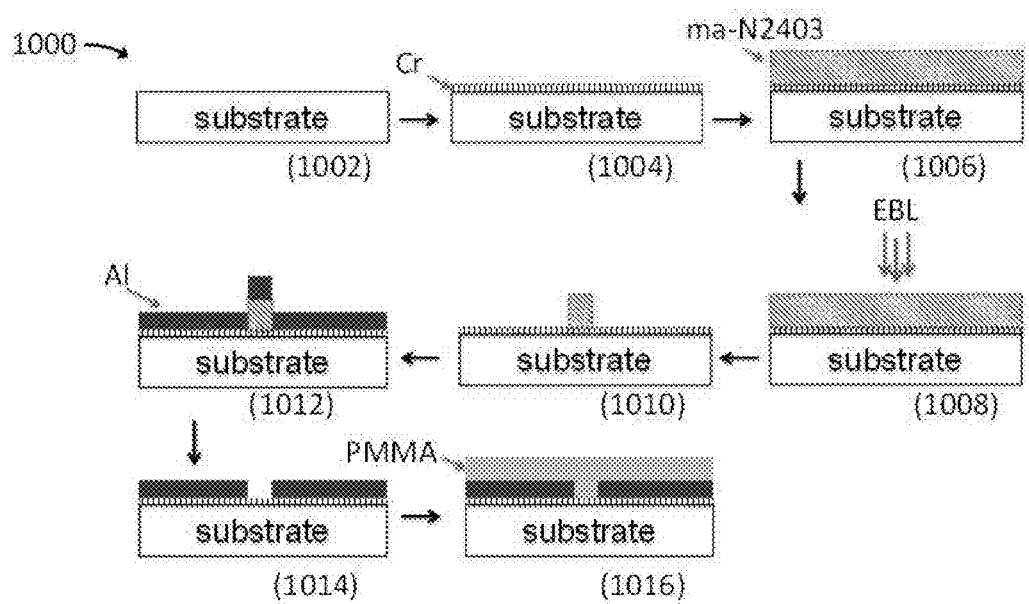
FIG. 10B shows the schematic fabrication process of a transmission nano-substrate.

FIG. 10B shows the schematic process 1000 to fabricate the metal NHAs with good transmission colors. A quartz substrate (Quartz Scientific, Inc.), provided at event 1002, was first cleaned with Nanostrip (KMG Chemicals Inc.). Then a 4-nm-thick chromium (Cr) film was evaporated on top using thermal physical vapor deposition (event 1004), to make the substrate conductive. Then, ma-N2403 (Micro Resist technology GmbH), a negative tone electron-beam sensitive photoresist, was spin-coated on top of the substrate (event 1006). The thickness of the ma-N2403 film is about 350 nm. In an EBL process (event 1008), NHA patterns were exposed on the ma-N2403 film using an electron-beam writer (Raith e_LiNE). After EBL exposure, the sample was developed using AZ300MIF developer (AZ Electronic Materials) for 2 minutes (event 1010) followed by an oxygen descum process (gas: $O_2$; pressure: 150 mTorr; power: 30 W; time: 60 seconds) (event 1010). A 100-nm-thick aluminum was evaporated on top of the patterned ma-N2403 film using electron beam physical vapor deposition (event 1012). Then, the sample was immersed inside acetone under ultrasonic bath for 2 hours to completely remove the electron-beam resist and the metal on top (event 1014). In the following, a 200-nm-thick PMMA (PMMA A4 950K, MicroChem Corp.) layer was spin-coated on top of the NHAs to achieve index matching (event 1016).

Figure 10C:
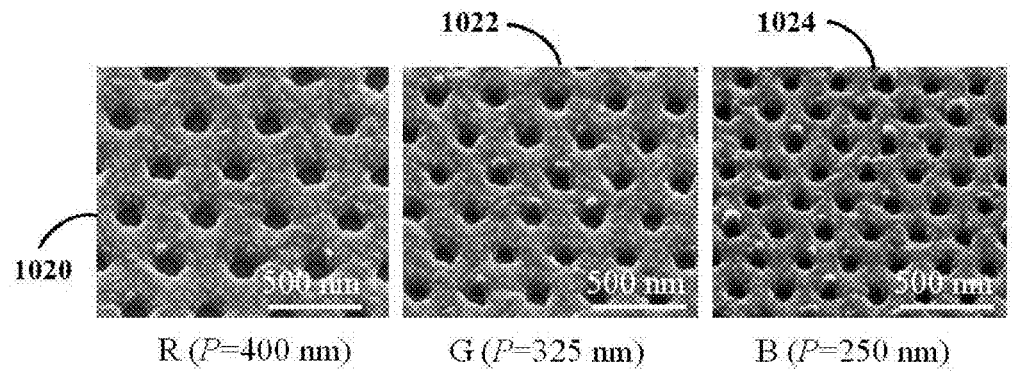
FIG. 10C shows the scanning electron microscope images of the fabricated metal nanohole arrays.

FIG. 10C shows the structure details of the fabricated NHAs captured by SEM (45° images). Image 1020, 1022 and 1024 is the SEM image of red, green and blue subpixel, respectively. For the red subpixel, P=400 nm and r=75 nm; for the green subpixel, P=325 nm and r=50 nm; for the blue subpixel, P=250 nm and r=45 nm.

Figure 10D:
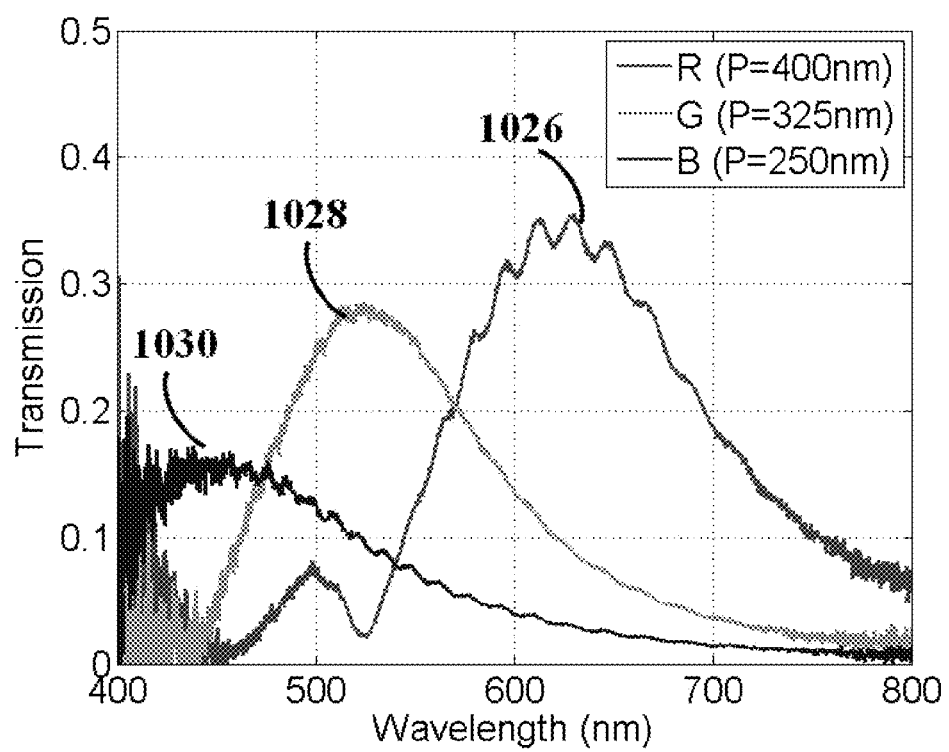
FIG. 10D shows the measured transmission spectra of the fabricated metal nanohole arrays.

FIG. 10D shows the measured transmission spectra of the subpixels. Curve 1026, 1028 and 1030 is the transmission spectrum of red, green and blue subpixel, respectively. For the red subpixel, the strong transmission peak is centered at 620 nm which corresponds to (1, 0) mode and the relatively weaker peak is centered at 500 nm which corresponds to (1, 1) mode. For the green subpixel, the transmission peak is centered at 520 nm which corresponds to (1, 0) mode. For the blue subpixel, the transmission peak is centered at 450 nm which corresponds to (1, 0) mode. It can be noticed that there is strong color leaking between blue subpixel and the green subpixel, which is caused by the chromium under layer that reduces the strength of the resonance.

While the metal NHAs in the example embodiments are shown as triangular arrays, other lattice configurations are also possible, such as square, rectangular or aperiodic arrays, without deviating from the teaching of the present disclosure.

In at least some example embodiments, the method and apparatus for producing color images onto the nano-photopaper 800 will be demonstrated with nano-photopaper 800 containing primary color pixels viewed under transmission mode. It should be noted that, fabricating pixilated metal nanohole arrays with high quality transmission colors in large scale is quite challenging, because it requires accurate control of the diameter of nanoholes, periodicity and thickness of metal film at the same time. Using a wafer-based sheet-to-sheet technology, in accordance with the teaching of Jia et al. (Nanotechnol. 24, 195501, 2013), large-area (as big as a silicon wafer) nano-substrates with high quality transmission colors can be fabricated with low cost.

Owing to the optical properties of the sub-wavelength structures comprising the primary color pixels in the example embodiments, the intrinsic light-filtering properties can be directly utilized to produce a color image by exposing the nano-photopaper 800 with a proper exposure image.

In at least some example embodiments, black/white photographic film based on silver halide was used as the photo-sensitive layer 814. A microfilm PT-20 (Fujifilm Canada) was mechanically attached to the surface of the fabricated NHAs sample using a clamp. The microfilm is a high contrast black/white panchromatic film which allows for 850 lines/mm resolution.

Figure 11A:
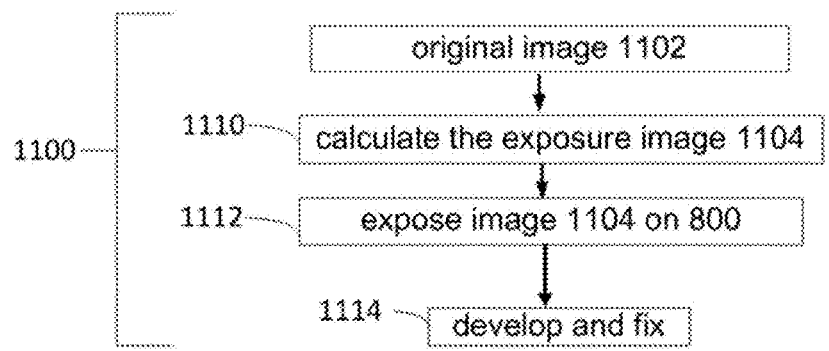
FIG. 11A shows a schematic of a method to produce a color image onto the nano-photopaper.
Figure 11B:
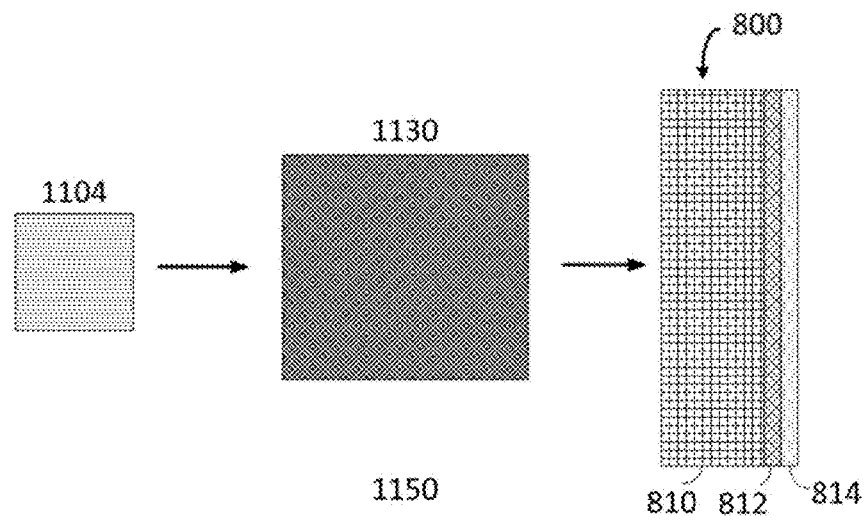
FIG. 11B shows a schematic of an apparatus to produce a color image onto the nano-photopaper.

Reference is now made to FIG. 11A, which schematically shows a method 1100 to produce an original image 1102 onto the nano-photopaper 800. The information for the original image 1102 can also be determined from a memory, such as an image file, for example. The exposure image 1104 is first calculated according to the original image 1102. The exposure image 1104 is the inverted color image of the original image 1102 and may be adjusted according to the property of the photo-sensitive material and/or the developing chemistry. In order to produce a color image onto the nano-photopaper 800, the exposure image 1104 is exposed onto the nano-photopaper 800 (step 1112) and then the exposed material is developed and fixed (step 1114). FIG. 11B schematically shows an apparatus 1150 to expose the exposure image 1104 onto the nano-photopaper 800 via optical setup 1130. The exposure image 1104 can be a color photo printed on a photopaper or a plate illuminated with a light source, or a color transparency, or a color image projected onto a screen by a projector or a digital light processing (DLP) device, or a color image formed on a display device such as a color LCD screen, etc. The optical setup 1130 is similar to a black/white film camera and includes lenses, apertures, shutters, filters and other necessary optical components to properly focus the exposure image 1104 onto the nano-photopaper 800. The shutter allows for control of the exposure time which can vary from a few milliseconds to a few minutes, depending on the illumination conditions, sensitivity of the emulsion in layer 814 and the aperture size. The focal plane of the exposure image is on the pixel layer 812. The nano-photopaper 800 is mounted perpendicular to the optical axis of the optical setup 1130 and the photo-sensitive layer 814 is facing away from the optical setup 1130. The exposure image 1104 is focused onto the pixel layer 812, and the transmitted light through each primary color pixel exposes a spot into the photo-sensitive layer 814. After exposure, the photo-sensitive layer 814 is developed and fixed to form a robust luminance pattern, i.e. a gray-scale image. The gray-scale image acts as the intensity control layer for the underlying pixels and tunes the intensity of the red, green and blue subpixels. A color image can thus be viewed from the nano-photopaper 800 by normal transmission.

When photons expose the emulsion in the photo-sensitive layer 814, they cause photochemical reaction of the silver halide and a gray-scale pattern is formed onto photo-sensitive layer 814 after developing. It should be pointed out that the gray-scale pattern is actually a pattern of silver particles in different densities that attenuate light in different amount. In accordance with the conventional black/white film photography, the gray-scale pattern formed on the photo-sensitive layer 814 can be either a negative image or a positive image, depending on the types of photo-sensitive films and the developing chemistry procedure implemented. In a negative developing procedure, in accordance with the teaching of Hirano et al. (U.S. Pat. No. 4,985,348, Jan. 15, 1991), an exposed spot is darker with higher exposure dose and the result image is a negative image of the exposure image. In a reversal developing procedure, in accordance with the teaching of Shibaoka et al. (U.S. Pat. No. 4,322,493, Mar. 30, 1982), an exposed spot is brighter with higher exposure dose and the result image is a positive image of the exposure image.

Figure 12A:
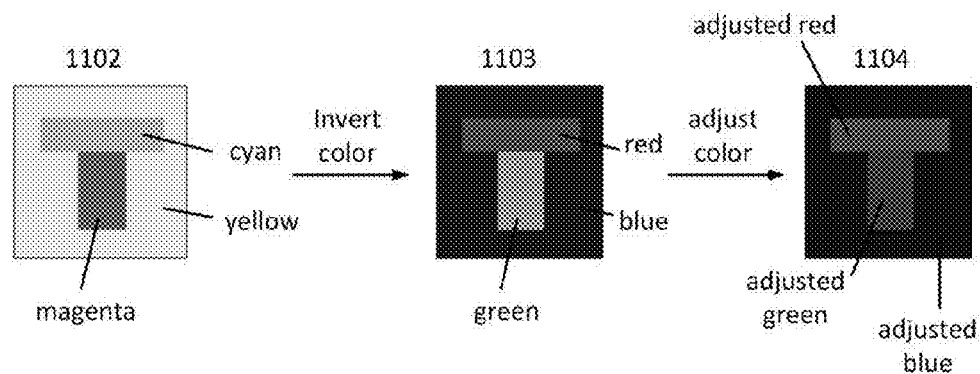
FIG. 12A schematically illustrates a process to calculate the exposure image from the original image.

Reference is now made to FIG. 12A, which illustrates the calculation of exposure image 1104 from the original image 1102. The original color image 1102 in this example is basically comprised of a horizontal cyan bar, a vertical magenta bar and a yellow background. In the first step of calculation, color inversion was done on the original image 1102 to obtain image 1103. Red/cyan, green/magenta, and blue/yellow are three pairs of complementary colors. The image 1103 therefore contains a red horizontal bar, a green vertical bar and a blue background. To be more specific, the color is defined as $[R_0, G_0, B_0]$ in RGB color space for a given point of the original image 1102. After color inversion, the color on the same point of the image 1103 is given by $[255-R_0, 255-G_0, 255-B_0]$, for 24-bit color depth. The exposure image 1104 is obtained by adjusting the values into $[255-R_0, 0.4*(255-G_0), 0.53*(255-B_0)]$, for the same point. The adjustment is necessary to balance the unequal sensitivity of the microfilm on the red, green and blue light. The adjustment coefficients were obtained through a calibration process of testing the sensitivity of the emulsion film with different colors of light. According to our calibration experiments, the microfilm is most sensitive to the green light and least sensitive to the red light.

In one example embodiment, the exposure image 1104 was printed onto a photopaper using an inkjet printer and the printed photo was mounted in front the lens of a film camera (RICOH XR-20SP). The distance between the printed photo and the camera lens (Pentax 28-80) is about 40 cm. The nano-photopaper 800 was loaded inside the camera film chamber. The exposure parameters of the camera are aperture (F/3.5), focal length 30 mm and exposure time 10 seconds. After exposure, the nano-photopaper was developed in pre-mixed microfilm developer (Microfilm Equipment Services Ltd.) for 70 seconds at room temperature and fixed in microfilm fixer (Microfilm Equipment Services Ltd.) for another 70 seconds. Then the nano-photopaper was rinsed in water and dried in air.

Figure 12B:
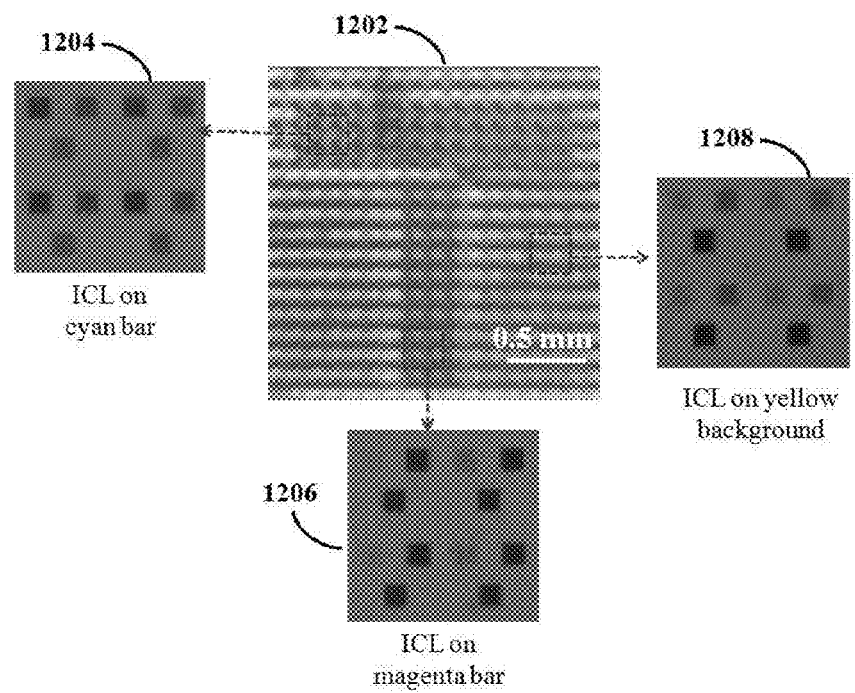
FIG. 12B shows experimental results of the color image produced onto a nano-photopaper.

FIG. 12B shows the results of the exposed and processed nano-photopaper. The image 1202 is the transmission image captured by a digital SLR camera (Canon 50D) with a 50 mm camera lens (F/22). The cyan horizontal bar, magenta vertical bar and yellow background were all obtained as desired. Image 1204, 1206 and 1208 demonstrate the intensity control layer pattern produced on the photo-sensitive layer 814 for different subregions. For the horizontal bar, the pattern is dark on the red subpixels but is grayish on the green and blue subpixels. Therefore, cyan color is produced from the horizontal bar. For the vertical bar, the pattern is dark on the green subpixels but is clear on the red subpixels and grayish on the blue subpixels. Therefore, magenta color is produced from the vertical bar. For the background region, the pattern is dark on the blue subpixels but is clear on the red and green subpixels. Therefore, yellow color is produced from the background region.

One skilled in the art presented in FIG. 10 may recognize that there is noticeable color leaking of the red pixel 818 into the blue color, and blue pixel 822 into the green color. The said color leaking may cause the produced color image to deviate from the original image.

While the example embodiments shown in FIGS. 12A and 12B use a simple image containing only cyan, magenta and yellow colors in different regions, the method 1100 can be used to produce any color image onto the nano-photopaper 800.

The nano-photopaper shown in FIG. 12B can be considered as a negative color photo-film, because the emulsion film was developed using negative processing. It should be pointed out that, using reversal processing (not shown here), the nano-photopaper 800 can become a positive color photo-film which can directly record an image of a physical object or a person, or can be used to copy the image from a given color image.

The nano-photopaper shown in FIG. 12B can be considered as a negative color photo-film. It should be pointed out that, using reversal processing (not shown here), the nano-photopaper 800 can become a positive color photo-film which can directly record an image of a physical object or a person, or copy the image from a given color image Although in the example embodiments 2-D arrays of subpixels are used in the nano-photopaper, the method can also be generalized and applied to nano-photopaper containing only 1-D array of subpixels, for example, 1-D array of subpixels in a metal thread coated with a photo-sensitive layer.

Modifications can be made to equipment 1130 wherein laser beams of red, green and blue colors directly scan the nano-photopaper 800 with the exposure image 1104 onto the nano-photopaper 800.

In some example embodiments, the size of the nano-photopaper may range from a few millimeters to a few meters. Principally, the size of the nano-photopaper is only restricted by the fabrication technique. To produce a color image onto the nano-photopaper, the apparatus may include components to allow each subsection exposed serially. In some example embodiments, the nano-photopaper can be produced into a roll of flexible film and can be directly mounted into a film camera to record multiple snapshots.

In some example embodiments, digital information can be encoded into 2-D color barcodes to form a color image and the said image can be produced onto the nano-photopaper. The coded information can be read by an imaging device which may be a stand-alone device or a component attached to a mobile device.

In some example embodiments, the produced color images may only be able to be correctly viewed from a certain angle and may require specific illumination conditions and/or assisting devices. Such a feature may be ideal for security applications. In some example embodiments, the nano-photopaper may include an active layer acting as a light source to illuminate the produced image and may also include functional layers to supply energy for the light source.

In some example embodiments, the nano-photopaper may be simplified for producing images with simple colors. For example, a nano-photopaper may contain only red and green primary color pixels and can be used to produce a color image that only contain colors presentable by mixture of red and green colors.

In the above-described embodiments, metal NHAs are used as primary color pixels for $0^{th}$ order transmission colors. Modifications can be made to include metal nano-particles, metal nano-slits, metal nano-cavities, metal nano-hole-nano-particle hybrids or a metal film structured with periodic topography. The methods and apparatus in example embodiments can be used to produce color images onto a nano-photopaper comprised of dielectric sub-wavelength structures.

The produced color images and optically variable graphics described in at least some of the described example embodiments may be used for security applications including optical document security labels and identity photos. In some example embodiments, the security document can be provided in the form of a thin flexible sheet, such as may be used in common security documents such as banknotes, passports, certificates, identification documents, financial documents, authentication certificates, and other value papers, for example. The security document can include a document substrate forming the backbone of the security document, and in which other components of the security document may be embedded and/or on which other components may be attached or printed, for example. In other example embodiments, the security document can be in the form of a rigid sheet or apparatus, for example for identification or security cards, tags, badges, etc.

The produced color images and optically variable graphics described in at least some of the described example embodiments may be used for artistic purposes including clothing material, advertisements and decorative pictures.

The produced color images and optically variable graphics described in at least some of the described example embodiments may be used for safety applications, such as traffic signs and warning signs.

An example method of authenticating a security document may be implemented by an automatic machine such as an electronic scanning and/or verification machine for example. Such machine may be configured to at least detect an invisible spectrum for covert information. Common examples of such electronic verification machines include ATM or point of purchase scanning machines for banknote or other currency-related security documents, and access point scanning machines for passports or other identity-related security documents, for example.

Although reference has been made herein to layers and pixels, it could be appreciated that the described example embodiments can be similarly applied to three-dimensional structures or forms. In an example embodiment, the three-dimensional structures may include voxel sets defined by at least two types of voxels of different optical properties, colors, and/or variable angle in combination with or as an expanded form of the described pixels, as appropriate. In some example embodiments, reference to layer may not necessarily mean a 2-D plane, but in some example embodiments may be layered onto other types of surfaces, such as a curved surface, or a patterned surface such as ridges, waves, etc., or in or around a 3-D object, etc. Reference to layer can also include a 1-D pattern, for example on a thread.

Certain adaptations and modifications of the described embodiments can be made. Therefore, the above discussed embodiments are considered to be illustrative and not restrictive. Example embodiments described as methods would similarly apply to systems, and vice-versa.

Variations may be made to some example embodiments, which may include combinations and sub-combinations of any of the above. The various embodiments presented above are merely examples and are in no way meant to limit the scope of this disclosure. Variations of the innovations described herein will be apparent to persons of ordinary skill in the art, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover and embrace all suitable changes in technology.

What is claimed is:

1. A photo-recordable display media, comprising:
   a sub-wavelength substrate including subpixels which include colors that define a color space and which are generic to any pattern, each subpixel defined by at least one sub-wavelength structure having at least one transmission color, wherein the specific transmission color is from interaction of incident light with at least one subwavelength structure; and
   a photo-sensitive layer which is configured to record an intensity of incident light transmitted through the sub-wavelength structures to form into, upon photography processing, an intensity control layer having a black/white or grayscale static pattern,
   wherein the black/white or grayscale static pattern of the intensity control layer individually controls an amount of luminance of each individual of said subpixels from incident external light to display a color pattern.

2. The photo-recordable display media as claimed in claim 1, wherein the sub-wavelength substrate further comprises pixel sets, each pixel set being defined by a subset of the subpixels exclusive to the other pixel sets, wherein at least two of the subpixels in each pixel set have a different specific transmission color.

3. The photo-recordable display media as claimed in claim 2, wherein the subpixels for one of the pixel sets have a same respective at least one specific transmission color as the subpixels for another one of the pixel sets.

4. The photo-recordable display media as claimed in claim 2, wherein the subpixels for all of the pixel sets have a same respective at least one specific transmission color.

5. The photo-recordable display media as claimed in claim 2, wherein each subset of subpixels for each pixel set includes subpixels in proximity to each other to provide an effective output which is perceivable as a combination of the individual subpixels.

6. The photo-recordable display media as claimed in claim 5, wherein each subset of subpixels further includes at least one subpixel having an invisible optical band.

7. The photo-recordable display media as claimed in claim 2, wherein said pixel sets are arranged in at least one of an array, a grid, an aperiodic, and a periodic arrangement.

8. The photo-recordable display media as claimed in claim 2, wherein each subset of subpixels includes at least one subpixel having an invisible optical band.

9. The photo-recordable display media as claimed in claim 1, wherein the color space includes: 1) subpixels which are red, green and blue; or 2) subpixels which are cyan, magenta and yellow.

10. The photo-recordable display media as claimed in claim 1, wherein the subpixels include an angle dependence.

11. The photo-recordable display media as claimed in claim 1, wherein the color pattern includes information for communication to a recipient or a reader device.

12. The photo-recordable display media as claimed in claim 1, wherein the color pattern includes at least one pattern in a visible optical band, at least one pattern in an invisible optical band, or a combination thereof.

13. The photo-recordable display media as claimed in claim 1, wherein at least one of the subpixels has an invisible optical band.

14. The photo-recordable display media as claimed in claim 13, wherein the invisible optical band is from at least one of infrared spectrum and ultraviolet spectrum.

15. The photo-recordable display media as claimed in claim 1, wherein the controlled amount of luminance by the intensity control layer includes an attenuation of at least some of said subpixels.

16. The photo-recordable display media as claimed in claim 1, wherein the at least one sub-wavelength structure further comprises: a metal film having sub-wavelength apertures; or a metal film structured with periodic topology; or a metal film having sub-wavelength cavities; or sub-wavelength metal particles; or a metal film having sub-wavelength apertures and sub-wavelength metal particles; or said particles are stacked on top of said apertures; or a dielectric film structured with periodic topography; or said dielectric film comprises at least two dielectric materials of different refractive index; or a combination or a sub-combination thereof.

17. The photo-recordable display media as claimed in claim 1, wherein the specific optical band of at least some subpixels include visible color, and wherein the specific optical band of at least some other subpixels include invisible optical radiation.

18. The photo-recordable display media as claimed in claim 1, wherein the at least one sub-wavelength structure is configured to display the respective specific optical band due to: transmission of incident light; or reflection of incident light; or diffraction of incident light; or scattering of incident light; or resonance of incident light; or a combination or sub-combination thereof.

19. The photo-recordable display media as claimed in claim 1, wherein each of said subpixels have size ranging from 200 nanometers to 500 micrometers or even larger.

20. The photo-recordable display media as claimed in claim 1, wherein the intensity control layer includes an applicable size of open aperture in an optically-opaque film to individually control the amount of luminance of each individual of said subpixels.

21. The photo-recordable display media as claimed in claim 1, wherein the intensity control layer includes subregions and each subregion includes an applicable optical transmission to individually control the amount of luminance of each individual of said subpixels.

22. The photo-recordable display media as claimed in claim 1, wherein when the incident light and/or viewing angles are varied the display media displays shifting color and/or intensity shifting effects over a range of the varied incident light or viewing angles.

23. The photo-recordable display media as claimed in claim 22, wherein the display media functions as an optically variable graphic.

24. An optical document security device for authentication purposes, wherein at least one designed color image is produced onto the photo-recordable display media as claimed in claim 1, wherein said optical document security device displays an optically variable graphic.

25. A security identity device, wherein an image of a person is produced onto the photo-recordable display media as claimed in claim 1;
   wherein said image of said person displays an optically variable graphic of said person; and
   wherein said person's identifying information or other data is displayable as covert information for enhanced security.

26. A publishing media produced onto the photo-recordable display media claimed in claim 1, for artistic, advertisement or safety purposes;
   wherein said publishing media displays visible information; and wherein said publishing media includes displayable covert information.

27. A non-transitory tangible optical storage medium for information storage and information communication, wherein information is encoded as at least one of color patterns, black/white patterns, covert patterns, and/or binary data, produced onto the photo-recordable display media as claimed in claim 1.

28. The non-transitory tangible optical storage medium as claimed in claim 27, wherein the information in said optical storage medium is at least partially readable by way of a visible optical band.

29. The non-transitory tangible optical storage medium as claimed in claim 27, wherein the information in said optical storage medium is at least partly readable or recoverable using a reader device.

30. The non-transitory tangible optical storage medium as claimed in claim 29, wherein the reader device is further configured to detect radiation in a non-visible optical band.

31. The photo-recordable display media as claimed in claim 1, wherein said photography processing comprises exposure with light and chemical processing.

32. The photo-recordable display media as claimed in claim 1, wherein the intensity control layer does not require a power source to control an amount of attenuation of each individual of said subpixels.

33. A method for producing color images onto a photo-recordable display media including a pixel layer which includes colors that define a color space, and which are generic to any pattern, with sub-wavelength structures having at least one specific transmission color, and a photo-sensitive layer which is configured to record an intensity of incident light transmitted through the subwavelength structures, the method comprising:
    exposing an exposure image or an original physical object onto the sub-wavelength structures and transmitted colored light through the sub-wavelength structures exposes the photo-sensitive layer; and
    photography processing of the photo-sensitive layer to form an intensity control layer having a black/white or grayscale static pattern,
    wherein the black/white or grayscale static pattern of the intensity control layer individually controls an amount of luminance of each individual of said subpixels from incident external light to display a color pattern.

34. The method of claim 33, further comprising:
    loading the photo-recordable display media into a film camera prior to said exposing.

35. The method as claimed in claim 33, further comprising:
    determining desired overt information; and
    calculating the exposure image.

36. The method as claimed in claim 33, wherein said exposure is carried out by loading the photo-sensitive layer inside a laser writer that incorporates red, green and blue laser beams to write the calculated exposure image onto the photo-sensitive layer.

37. The method as claimed in claim 33, wherein said photography processing comprises exposure with light and chemical processing.

* * * * *